US012484978B2

(12) United States Patent
Soto et al.

(10) Patent No.: US 12,484,978 B2
(45) Date of Patent: Dec. 2, 2025

(54) ROBOTIC SYSTEM INCLUDING A LINK TRACKER

(71) Applicant: MAKO Surgical Corp., Weston, FL (US)

(72) Inventors: Victor Soto, Coral Gables, FL (US); Alan Ross, Albuquerque, NM (US); David Gene Bowling, Los Ranchos De Albuquerque, NM (US); Jochen Breisacher, Teningen (DE); Jonathan Mark Morgan, Biscayne Park, FL (US); Dave A. Sinclair, Miramar, FL (US); David DiPietro, Portland, OR (US); David Robert Whisler, San Mateo, CA (US); Paul David Ekegren, Albuquerque, NM (US); Paul Shiels, Albuquerque, NM (US)

(73) Assignee: MAKO Surgical Corp., Weston, FL (US)

( * ) Notice: Subject to any disclaimer, the term of this patent is extended or adjusted under 35 U.S.C. 154(b) by 282 days.

(21) Appl. No.: 18/115,964

(22) Filed: Mar. 1, 2023

(65) Prior Publication Data
US 2023/0277256 A1    Sep. 7, 2023

Related U.S. Application Data

(60) Provisional application No. 63/315,665, filed on Mar. 2, 2022.

(51) Int. Cl.
*A61B 34/30* (2016.01)
*A61B 34/00* (2016.01)
(Continued)

(52) U.S. Cl.
CPC .............. *A61B 34/30* (2016.02); *A61B 34/20* (2016.02); *A61B 34/73* (2016.02); *A61B 46/10* (2016.02);
(Continued)

(58) Field of Classification Search
CPC ......... A61B 34/30; A61B 34/20; A61B 34/73; A61B 46/10; A61B 2034/2055;
(Continued)

(56) References Cited

U.S. PATENT DOCUMENTS 3,482,567 A    12/1969    Franklin
3,483,494 A    12/1969    Cromie
(Continued)

FOREIGN PATENT DOCUMENTS

AU    754882 B2    11/2002
GB    2483154 A    2/2012
(Continued)

OTHER PUBLICATIONS

International Search Report for International Application No. PCT/US2023/014243 dated Aug. 11, 2023, 3 pages.
(Continued)

*Primary Examiner* — Alexei Bykhovski
(74) *Attorney, Agent, or Firm* — Howard & Howard Attorneys PLLC

(57) ABSTRACT

Surgical robotic systems and navigation systems employ a robotic arm including a plurality of links. A link tracker assembly is located on the surface of one or more of the links to enable the link to be tracked by a localizer. The link tracker assemblies can utilize a plurality of tracker elements that can be removably coupled to the link. A photosensor assembly is located on the surface of one or more of the links to receive signals from the localizer for controlling the link tracker assembly. The robotic arm can be coupled to a base
(Continued)

and the systems can be used in collaboration with a base tracker that is coupled to the base. The robotic arm can also include a mounting interface for receiving an end effector and the systems can be used in collaboration with an end effector tracker that is coupled to the end effector.

19 Claims, 7 Drawing Sheets

(51) Int. Cl.
    *A61B 34/20*    (2016.01)
    *A61B 46/10*    (2016.01)

(52) U.S. Cl.
    CPC . *A61B 2034/2055* (2016.02); *A61B 2034/305* (2016.02)

(58) Field of Classification Search
    CPC ... A61B 2034/305; A61B 46/23; A61B 50/13; A61B 2034/2051; A61B 2090/065; A61B 2090/3945; A61B 2090/3979
    See application file for complete search history.

(56) References Cited

U.S. PATENT DOCUMENTS

| | | |
|---|---|---|
| 3,796,477 A | 3/1974 | Geraci |
| 4,409,738 A | 10/1983 | Renander et al. |
| 4,522,196 A | 6/1985 | Cunningham et al. |
| 4,770,497 A | 9/1988 | Brown |
| 5,042,981 A | 8/1991 | Gross |
| 5,080,108 A | 1/1992 | Roth |
| 5,122,904 A | 6/1992 | Fujiwara et al. |
| 5,184,601 A | 2/1993 | Putman |
| 5,274,500 A | 12/1993 | Dunn |
| 5,413,573 A | 5/1995 | Koivukangas |
| 5,433,221 A | 7/1995 | Adair |
| 5,441,042 A | 8/1995 | Putman |
| 5,457,962 A | 10/1995 | Faries, Jr. et al. |
| 5,467,223 A | 11/1995 | Cleveland, Jr. et al. |
| 5,524,643 A | 6/1996 | Faries, Jr. et al. |
| 5,574,561 A | 11/1996 | Boudreau et al. |
| 5,591,119 A | 1/1997 | Adair |
| 5,626,216 A | 5/1997 | Sperling et al. |
| 5,642,956 A | 7/1997 | Hale |
| 5,653,938 A | 8/1997 | Faries, Jr. et al. |
| 5,669,152 A | 9/1997 | McMurtry |
| 5,762,458 A | 6/1998 | Wang et al. |
| 5,769,554 A | 6/1998 | Slocum |
| 5,785,643 A | 7/1998 | Lynn |
| 5,800,483 A | 9/1998 | Vought |
| 5,816,252 A | 10/1998 | Faries, Jr. et al. |
| 5,853,363 A | 12/1998 | Vought |
| 5,855,583 A | 1/1999 | Wang et al. |
| 5,857,467 A | 1/1999 | Faries, Jr. et al. |
| 5,876,328 A | 3/1999 | Fox et al. |
| 5,891,020 A | 4/1999 | Luber et al. |
| 5,960,794 A | 10/1999 | Shaw |
| 6,050,981 A | 4/2000 | Lampropoulos et al. |
| 6,063,095 A | 5/2000 | Wang et al. |
| 6,065,898 A | 5/2000 | Hale |
| 6,072,569 A | 6/2000 | Bowen |
| 6,091,058 A | 7/2000 | Faries, Jr. et al. |
| 6,102,044 A | 8/2000 | Naidyhorski |
| 6,102,850 A | 8/2000 | Wang et al. |
| 6,105,578 A | 8/2000 | Sommers et al. |
| 6,122,541 A | 9/2000 | Cosman et al. |
| 6,123,080 A | 9/2000 | Mohan et al. |
| 6,132,368 A | 10/2000 | Cooper |
| 6,228,089 B1 | 5/2001 | Wahrburg |
| 6,325,351 B1 | 12/2001 | Hale et al. |
| 6,330,837 B1 | 12/2001 | Charles et al. |
| 6,331,181 B1 | 12/2001 | Tierney et al. |
| 6,346,072 B1 | 2/2002 | Cooper |
| 6,357,445 B1 | 3/2002 | Shaw |
| 6,371,121 B1 | 4/2002 | Faries, Jr. et al. |
| 6,375,610 B2 | 4/2002 | Verschuur |
| 6,416,462 B1 | 7/2002 | Tovey et al. |
| 6,431,530 B1 | 8/2002 | Stamps et al. |
| 6,436,107 B1 | 8/2002 | Wang et al. |
| 6,460,436 B1 | 10/2002 | Salzer et al. |
| 6,471,172 B1 | 10/2002 | Lemke et al. |
| 6,491,701 B2 | 12/2002 | Tierney et al. |
| 6,608,688 B1 | 8/2003 | Faul et al. |
| 6,612,310 B2 | 9/2003 | Sklar |
| 6,661,955 B1 | 12/2003 | Calvet et al. |
| 6,679,267 B2 | 1/2004 | McNeirney et al. |
| 6,692,141 B2 | 2/2004 | Jesurun et al. |
| 6,697,664 B2 | 2/2004 | Kienzle, III et al. |
| 6,699,177 B1 | 3/2004 | Wang et al. |
| 6,720,988 B1 | 4/2004 | Gere et al. |
| 6,755,195 B1 | 6/2004 | Lemke et al. |
| 6,804,547 B2 | 10/2004 | Pelzer et al. |
| 6,805,453 B2 | 10/2004 | Spetzler et al. |
| 6,810,881 B2 | 11/2004 | Faries, Jr. et al. |
| 6,843,252 B2 | 1/2005 | Harrison et al. |
| 6,860,271 B2 | 3/2005 | Faries, Jr. et al. |
| 6,863,071 B2 | 3/2005 | Annett et al. |
| 6,866,671 B2 | 3/2005 | Tierney et al. |
| 6,910,485 B2 | 6/2005 | Faries, Jr. et al. |
| 6,918,395 B2 | 7/2005 | Faries, Jr. et al. |
| 7,002,102 B2 | 2/2006 | Münch et al. |
| 7,044,132 B2 | 5/2006 | Masini |
| 7,048,745 B2 | 5/2006 | Tierney et al. |
| 7,074,180 B2 | 7/2006 | Bertolero et al. |
| 7,118,582 B1 | 10/2006 | Wang et al. |
| 7,122,032 B2 | 10/2006 | Shinmura et al. |
| 7,331,967 B2 | 2/2008 | Lee et al. |
| 7,347,210 B2 | 3/2008 | Faries, Jr. et al. |
| 7,350,373 B1 | 4/2008 | Faries, Jr. et al. |
| 7,357,774 B2 | 4/2008 | Cooper |
| 7,418,966 B2 | 9/2008 | Faries, Jr. et al. |
| 7,524,320 B2 | 4/2009 | Tierney et al. |
| 7,666,191 B2 | 2/2010 | Orban, III et al. |
| 7,699,855 B2 | 4/2010 | Anderson et al. |
| 7,725,162 B2 | 5/2010 | Malackowski et al. |
| 7,727,244 B2 | 6/2010 | Orban, III et al. |
| 7,775,213 B2 | 8/2010 | Henke-Sarmento et al. |
| 7,789,874 B2 | 9/2010 | Yu et al. |
| 7,819,885 B2 | 10/2010 | Cooper |
| 7,820,446 B2 | 10/2010 | Feilkas et al. |
| 7,850,602 B2 | 12/2010 | Humble et al. |
| 7,850,642 B2 | 12/2010 | Moll et al. |
| 7,886,743 B2 | 2/2011 | Cooper et al. |
| 7,947,050 B2 | 5/2011 | Lee et al. |
| 7,947,051 B2 | 5/2011 | Lee et al. |
| 7,955,322 B2 | 6/2011 | Devengenzo et al. |
| 7,959,860 B2 | 6/2011 | Faries, Jr. et al. |
| 7,963,288 B2 | 6/2011 | Rosenberg et al. |
| 7,963,913 B2 | 6/2011 | Devengenzo et al. |
| 7,972,298 B2 | 7/2011 | Wallace et al. |
| 7,974,681 B2 | 7/2011 | Wallace et al. |
| 8,005,537 B2 | 8/2011 | Hlavka et al. |
| 8,021,326 B2 | 9/2011 | Moll et al. |
| 8,052,636 B2 | 11/2011 | Moll et al. |
| 8,054,184 B2 | 11/2011 | Cline et al. |
| 8,074,657 B2 | 12/2011 | Scott et al. |
| 8,105,319 B2 | 1/2012 | Doyle et al. |
| 8,105,338 B2 | 1/2012 | Anderson et al. |
| 8,142,447 B2 | 3/2012 | Cooper et al. |
| 8,146,825 B1 | 4/2012 | Prpa |
| 8,148,666 B2 | 4/2012 | Faries, Jr. et al. |
| 8,182,469 B2 | 5/2012 | Anderson et al. |
| 8,182,470 B2 | 5/2012 | Devengenzo et al. |
| 8,190,238 B2 | 5/2012 | Moll et al. |
| 8,196,586 B2 | 6/2012 | Henke-Sarmento et al. |
| 8,202,278 B2 | 6/2012 | Orban, III et al. |
| 8,206,053 B2 | 6/2012 | Bennett et al. |
| 8,206,406 B2 | 6/2012 | Orban, III |
| 8,216,250 B2 | 7/2012 | Orban, III et al. |
| 8,220,468 B2 | 7/2012 | Cooper et al. |
| 8,225,495 B2 | 7/2012 | Dehler |
| 8,241,208 B2 | 8/2012 | Jiang et al. |

(56) References Cited

U.S. PATENT DOCUMENTS

| | | |
|---|---|---|
| 8,257,303 B2 | 9/2012 | Moll et al. |
| 8,264,767 B2 | 9/2012 | Nozawa |
| 8,273,076 B2 | 9/2012 | Devengenzo et al. |
| 8,286,637 B2 | 10/2012 | Kaska |
| 8,311,626 B2 | 11/2012 | Hlavka et al. |
| 8,375,808 B2 | 2/2013 | Blumenkranz et al. |
| 8,386,011 B2 | 2/2013 | Wieczorek |
| 8,392,022 B2 | 3/2013 | Ortmaier et al. |
| 8,394,054 B2 | 3/2013 | Wallace et al. |
| 8,409,136 B2 | 4/2013 | Wallace et al. |
| 8,413,948 B2 | 4/2013 | Kemeny |
| 8,460,277 B2 | 6/2013 | Suarez et al. |
| 8,464,722 B2 | 6/2013 | Chua |
| 8,469,947 B2 | 6/2013 | Devengenzo et al. |
| 8,529,582 B2 | 9/2013 | Devengenzo et al. |
| 8,534,848 B2 | 9/2013 | Hauri et al. |
| 8,548,779 B2 | 10/2013 | Ortmaier et al. |
| 8,602,031 B2 | 12/2013 | Reis et al. |
| 8,608,773 B2 | 12/2013 | Tierney et al. |
| 8,640,706 B2 | 2/2014 | Skora et al. |
| 8,662,082 B2 | 3/2014 | Bogojevic et al. |
| 8,672,922 B2 | 3/2014 | Loh et al. |
| 8,678,009 B2 | 3/2014 | Hagn |
| 8,720,448 B2 | 5/2014 | Reis et al. |
| 8,740,881 B2 | 6/2014 | Ortmaier et al. |
| 8,746,252 B2 | 6/2014 | McGrogan et al. |
| 8,776,800 B2 | 7/2014 | Skora et al. |
| 8,784,435 B2 | 7/2014 | Cooper et al. |
| 8,844,538 B2 | 9/2014 | Stang |
| 8,888,764 B2 | 11/2014 | Devengenzo et al. |
| 8,894,634 B2 | 11/2014 | Devengenzo et al. |
| 8,910,637 B2 | 12/2014 | Winer |
| 8,945,095 B2 | 2/2015 | Blumenkranz et al. |
| 8,998,799 B2 | 4/2015 | Orban, III et al. |
| 8,998,930 B2 | 4/2015 | Orban, III |
| 9,008,757 B2 | 4/2015 | Wu |
| 9,033,958 B2 | 5/2015 | Mailloux et al. |
| 9,044,269 B2 | 6/2015 | Woerlein |
| 9,096,033 B2 | 8/2015 | Holop et al. |
| 9,119,655 B2 | 9/2015 | Bowling et al. |
| 9,161,816 B2 | 10/2015 | Ball et al. |
| 9,168,103 B2 | 10/2015 | Hladio et al. |
| 9,259,277 B2 | 2/2016 | Rogers et al. |
| 9,265,582 B2 | 2/2016 | Riviere et al. |
| 9,283,041 B2 | 3/2016 | Adams |
| 9,295,521 B2 | 3/2016 | Pack et al. |
| 9,307,945 B2 | 4/2016 | Campista |
| 9,320,568 B2 | 4/2016 | Orban, III et al. |
| 9,566,120 B2 | 2/2017 | Malackowski et al. |
| 9,566,121 B2 | 2/2017 | Staunton et al. |
| 9,579,793 B2 | 2/2017 | Jacob et al. |
| 9,629,680 B2 | 4/2017 | Winer |
| 9,713,498 B2 | 7/2017 | Malackowski et al. |
| 9,724,163 B2 | 8/2017 | Orban |
| 9,737,373 B2 | 8/2017 | Schuh |
| 9,883,915 B2 | 2/2018 | Rogers et al. |
| 9,993,310 B2 | 6/2018 | Pecora |
| 10,039,610 B2 | 8/2018 | Allen |
| 10,052,761 B2 | 8/2018 | Langenfeld |
| 10,085,803 B2 | 10/2018 | Higuchi et al. |
| 10,149,731 B2 | 12/2018 | Adams |
| 10,188,475 B2 | 1/2019 | Chua et al. |
| 10,213,267 B2 | 2/2019 | King et al. |
| 10,226,219 B2 | 3/2019 | Cheatham, III et al. |
| 10,231,791 B2 | 3/2019 | LeBoeuf, II et al. |
| 10,235,737 B2 | 3/2019 | Cheatham, III et al. |
| 10,247,545 B2 | 4/2019 | Elliot |
| 10,265,126 B2 | 4/2019 | Bruno et al. |
| 10,278,659 B2 | 5/2019 | Kim |
| 10,285,767 B2 | 5/2019 | Marinchak |
| 10,292,765 B2 | 5/2019 | Bruno et al. |
| 10,293,497 B2 | 5/2019 | Lohmeier et al. |
| 10,327,849 B2 | 6/2019 | Post |
| 10,335,116 B2 | 7/2019 | Boctor et al. |
| 10,335,242 B2 | 7/2019 | Devengenzo et al. |
| 10,342,625 B2 | 7/2019 | Loh et al. |
| 10,357,324 B2 | 7/2019 | Flatt et al. |
| 10,398,522 B2 | 9/2019 | Czajka, Jr. et al. |
| 10,433,925 B2 | 10/2019 | Shelton, IV et al. |
| 10,485,619 B2 | 11/2019 | Rogers et al. |
| 10,485,621 B2 | 11/2019 | Morrissette et al. |
| 10,492,873 B2 | 12/2019 | Hallen et al. |
| 10,499,832 B2 | 12/2019 | Greene et al. |
| 10,507,063 B2 | 12/2019 | Zuhars et al. |
| 10,537,358 B2 | 1/2020 | McGrogan et al. |
| 10,603,126 B2 | 3/2020 | Karguth et al. |
| 10,610,312 B2 | 4/2020 | Srivastava et al. |
| 10,639,110 B2 | 5/2020 | Hares |
| 10,646,280 B2 | 5/2020 | Crawford et al. |
| 10,660,715 B2 | 5/2020 | Dozeman |
| 10,702,354 B2 | 7/2020 | Wada et al. |
| 10,835,150 B2 | 11/2020 | Chi Sing et al. |
| 10,842,461 B2 | 11/2020 | Johnson et al. |
| 10,893,912 B2 | 1/2021 | Crawford et al. |
| 10,917,543 B2 | 2/2021 | Ramirez Luna et al. |
| 10,987,174 B2 | 4/2021 | Draper et al. |
| 10,993,771 B2 | 5/2021 | Srimohanarajah et al. |
| 11,020,187 B2 | 6/2021 | Kheradpir et al. |
| 11,096,754 B2 | 8/2021 | Soto et al. |
| 2002/0137358 A1 | 9/2002 | Binnard et al. |
| 2004/0077939 A1 | 4/2004 | Graumann |
| 2005/0088763 A1 | 4/2005 | Weaver et al. |
| 2006/0100610 A1 | 5/2006 | Wallace et al. |
| 2006/0142656 A1 | 6/2006 | Malackowski et al. |
| 2006/0161138 A1 | 7/2006 | Orban, III et al. |
| 2006/0191540 A1 | 8/2006 | Lamprich et al. |
| 2007/0267028 A1 | 11/2007 | Junk |
| 2007/0282311 A1 | 12/2007 | Scott et al. |
| 2008/0147089 A1 | 6/2008 | Loh et al. |
| 2008/0218770 A1 | 9/2008 | Moll et al. |
| 2008/0236598 A1 | 10/2008 | Gobel |
| 2009/0088772 A1 | 4/2009 | Blumenkranz |
| 2009/0248039 A1 | 10/2009 | Cooper et al. |
| 2010/0065068 A1 | 3/2010 | Hamazaki et al. |
| 2010/0170519 A1 | 7/2010 | Romo et al. |
| 2010/0241137 A1 | 9/2010 | Doyle et al. |
| 2010/0268249 A1 | 10/2010 | Stuart |
| 2010/0268250 A1 | 10/2010 | Stuart et al. |
| 2010/0308195 A1 | 12/2010 | Yu et al. |
| 2011/0087238 A1 | 4/2011 | Wang et al. |
| 2011/0088702 A1 | 4/2011 | King et al. |
| 2011/0190790 A1 | 8/2011 | Summerer et al. |
| 2011/0213383 A1 | 9/2011 | Lee et al. |
| 2011/0238083 A1 | 9/2011 | Moll et al. |
| 2011/0277775 A1 | 11/2011 | Holop et al. |
| 2011/0277776 A1 | 11/2011 | McGrogan et al. |
| 2012/0065472 A1 | 3/2012 | Doyle et al. |
| 2012/0071752 A1 | 3/2012 | Sewell et al. |
| 2012/0071821 A1 | 3/2012 | Yu |
| 2012/0071822 A1 | 3/2012 | Romo et al. |
| 2012/0071894 A1 | 3/2012 | Tanner et al. |
| 2012/0071895 A1 | 3/2012 | Stahler et al. |
| 2012/0080040 A1 | 4/2012 | Skora et al. |
| 2012/0080041 A1 | 4/2012 | Skora et al. |
| 2012/0083799 A1 | 4/2012 | Chen et al. |
| 2012/0083825 A1 | 4/2012 | Stroup et al. |
| 2012/0191107 A1 | 7/2012 | Tanner et al. |
| 2012/0209174 A1 | 8/2012 | Moll et al. |
| 2012/0209291 A1 | 8/2012 | Anderson et al. |
| 2012/0232566 A1 | 9/2012 | Orban, III et al. |
| 2012/0239060 A1 | 9/2012 | Orban, III |
| 2012/0247489 A1 | 10/2012 | Orban, III et al. |
| 2012/0289974 A1 | 11/2012 | Rogers et al. |
| 2012/0305650 A1 | 12/2012 | Prpa |
| 2012/0312308 A1 | 12/2012 | Allen |
| 2012/0330429 A1 | 12/2012 | Axelson, Jr. et al. |
| 2013/0035537 A1 | 2/2013 | Wallace et al. |
| 2013/0092177 A1 | 4/2013 | Chua et al. |
| 2013/0174858 A1 | 7/2013 | Annett |
| 2013/0211401 A1 | 8/2013 | Bailey et al. |
| 2013/0231679 A1 | 9/2013 | Wallace et al. |
| 2013/0247921 A1 | 9/2013 | Dye et al. |
| 2013/0331858 A1 | 12/2013 | Devengenzo et al. |
| 2014/0039681 A1 | 2/2014 | Bowling et al. |

(56) References Cited

U.S. PATENT DOCUMENTS

| | | |
|---|---|---|
| 2014/0130810 A1 | 5/2014 | Azizian et al. |
| 2014/0171965 A1 | 6/2014 | Loh et al. |
| 2014/0261456 A1 | 9/2014 | Malackowski et al. |
| 2014/0316257 A1 | 10/2014 | Woerlein et al. |
| 2014/0318551 A1 | 10/2014 | Daly |
| 2014/0326254 A1 | 11/2014 | McGrogan et al. |
| 2015/0047647 A1 | 2/2015 | Winer |
| 2015/0073437 A1 | 3/2015 | Devengenzo et al. |
| 2015/0133960 A1 | 5/2015 | Lohmeier et al. |
| 2015/0142012 A1 | 5/2015 | Lohmeier et al. |
| 2015/0148817 A1 | 5/2015 | Lohmeier et al. |
| 2015/0148818 A1 | 5/2015 | Lohmeier et al. |
| 2015/0150638 A1 | 6/2015 | Lohmeier et al. |
| 2015/0173841 A1 | 6/2015 | Orban |
| 2015/0202009 A1 | 7/2015 | Nussbaumer et al. |
| 2015/0305815 A1 | 10/2015 | Holop et al. |
| 2015/0342685 A1 | 12/2015 | Livesey |
| 2015/0366618 A1 | 12/2015 | Higuchi et al. |
| 2016/0008073 A1 | 1/2016 | Pecora |
| 2016/0058513 A1 | 3/2016 | Giorgi et al. |
| 2016/0081753 A1 | 3/2016 | Kostrzewski |
| 2016/0242861 A1 | 8/2016 | Flatt et al. |
| 2016/0306083 A1* | 10/2016 | Huldin .................. G02B 5/134 |
| 2016/0310224 A1 | 10/2016 | Dye et al. |
| 2016/0324583 A1 | 11/2016 | Kheradpir et al. |
| 2017/0000572 A1 | 1/2017 | Moctezuma de la Barrera et al. |
| 2017/0086934 A1 | 3/2017 | Devengenzo et al. |
| 2017/0165006 A1 | 6/2017 | Woods et al. |
| 2017/0239007 A1 | 8/2017 | Crawford et al. |
| 2017/0290632 A1 | 10/2017 | Nakatsu et al. |
| 2017/0333136 A1 | 11/2017 | Hladio et al. |
| 2017/0333147 A1 | 11/2017 | Bernstein |
| 2017/0348063 A1 | 12/2017 | Braun et al. |
| 2018/0000472 A1 | 1/2018 | Beira |
| 2018/0036091 A1 | 2/2018 | Scholan |
| 2018/0055593 A1 | 3/2018 | Schlatterer |
| 2018/0078332 A1 | 3/2018 | Mozes et al. |
| 2018/0116746 A1 | 5/2018 | Lennertz et al. |
| 2018/0125597 A1 | 5/2018 | Gogarty et al. |
| 2018/0132959 A1 | 5/2018 | Marshall et al. |
| 2018/0140371 A1 | 5/2018 | Hares et al. |
| 2018/0168750 A1 | 6/2018 | Staunton et al. |
| 2018/0193098 A1 | 7/2018 | Caluser |
| 2018/0200014 A1 | 7/2018 | Bonny et al. |
| 2018/0206931 A1 | 7/2018 | Scheib |
| 2018/0215051 A1 | 8/2018 | Kan |
| 2018/0289438 A1 | 10/2018 | Pennoyer |
| 2018/0296292 A1 | 10/2018 | Yamasaki et al. |
| 2018/0318021 A1 | 11/2018 | Kang |
| 2018/0325616 A1 | 11/2018 | Kapadia et al. |
| 2019/0039241 A1 | 2/2019 | Langenfeld et al. |
| 2019/0046281 A1 | 2/2019 | Johnson et al. |
| 2019/0046284 A1 | 2/2019 | Pennoyer et al. |
| 2019/0053866 A1 | 2/2019 | Seow et al. |
| 2019/0069969 A1 | 3/2019 | Higuchi et al. |
| 2019/0076204 A1 | 3/2019 | Robertson et al. |
| 2019/0099232 A1 | 4/2019 | Soto et al. |
| 2019/0133791 A1 | 5/2019 | Yadav et al. |
| 2019/0142540 A1 | 5/2019 | Chow |
| 2019/0151040 A1 | 5/2019 | Chua et al. |
| 2019/0223965 A1 | 7/2019 | Marshall et al. |
| 2019/0223969 A1 | 7/2019 | Ramstad et al. |
| 2019/0239969 A1 | 8/2019 | Abu-Akeel et al. |
| 2019/0247134 A1 | 8/2019 | Marinchak |
| 2019/0282313 A1 | 9/2019 | Devengenzo et al. |
| 2019/0282315 A1 | 9/2019 | Loh et al. |
| 2019/0290378 A1 | 9/2019 | Schwagli et al. |
| 2019/0298469 A1 | 10/2019 | Ramstad et al. |
| 2019/0321120 A1 | 10/2019 | Hutchison et al. |
| 2020/0000490 A1 | 1/2020 | McGrogan et al. |
| 2020/0030040 A1 | 1/2020 | Kostrzewski et al. |
| 2020/0046207 A1 | 2/2020 | Calavrezos et al. |
| 2020/0046442 A1 | 2/2020 | Rogers et al. |
| 2020/0069376 A1 | 3/2020 | Garcia et al. |
| 2020/0069383 A1 | 3/2020 | Betsugi et al. |
| 2020/0069386 A1 | 3/2020 | Betsugi et al. |
| 2020/0069389 A1 | 3/2020 | Morrissette et al. |
| 2020/0069390 A1 | 3/2020 | Betsugi et al. |
| 2020/0078109 A1 | 3/2020 | Steger et al. |
| 2020/0078184 A1 | 3/2020 | Burns et al. |
| 2020/0093556 A1 | 3/2020 | Zemlok et al. |
| 2020/0100848 A1 | 4/2020 | Zuhars et al. |
| 2020/0155241 A1 | 5/2020 | Cascarano et al. |
| 2020/0155243 A1 | 5/2020 | Crawford et al. |
| 2020/0170723 A1 | 6/2020 | Crawford et al. |
| 2020/0170724 A1 | 6/2020 | Flatt et al. |
| 2020/0170740 A1 | 6/2020 | Galili et al. |
| 2020/0179072 A1 | 6/2020 | Pennoyer et al. |
| 2020/0188050 A1 | 6/2020 | Pennoyer et al. |
| 2020/0205641 A1 | 7/2020 | Luck et al. |
| 2020/0205793 A1 | 7/2020 | Jang et al. |
| 2020/0205911 A1 | 7/2020 | Hufford et al. |
| 2020/0237449 A1 | 7/2020 | Marti et al. |
| 2020/0281676 A1 | 9/2020 | Rohs et al. |
| 2020/0282568 A1* | 9/2020 | Tanabe .................. B25J 13/06 |
| 2020/0305986 A1 | 10/2020 | Hladio et al. |
| 2020/0352657 A1 | 11/2020 | Fanson et al. |
| 2020/0352669 A1 | 11/2020 | Marshall et al. |
| 2020/0360092 A1 | 11/2020 | Deng et al. |
| 2020/0375670 A1* | 12/2020 | Bonny .................. A61B 34/20 |
| 2020/0405395 A1* | 12/2020 | Gullotti ............. A61B 17/7082 |
| 2020/0405405 A1 | 12/2020 | Shelton, IV et al. |
| 2021/0106342 A1 | 4/2021 | Blackwell |
| 2021/0124101 A1* | 4/2021 | Vishnia .................. G02B 5/122 |
| 2021/0322124 A1 | 10/2021 | Malackowski et al. |
| 2022/0087756 A1* | 3/2022 | Cascarano ............. A61B 90/39 |

FOREIGN PATENT DOCUMENTS

| | | | |
|---|---|---|---|
| GB | 2570514 A | 7/2019 | |
| GB | 2572333 A | 10/2019 | |
| WO | WO-2006091494 A1 * | 8/2006 | ......... A61B 17/1675 |
| WO | 2009092701 A1 | 7/2009 | |
| WO | 2009123891 A1 | 10/2009 | |
| WO | 2009123925 A1 | 10/2009 | |
| WO | 2010121107 A1 | 10/2010 | |
| WO | 2010121117 A1 | 10/2010 | |
| WO | 2013075204 A1 | 5/2013 | |
| WO | 2013075205 A1 | 5/2013 | |
| WO | 2013159932 A1 | 10/2013 | |
| WO | 2014162217 A1 | 10/2014 | |
| WO | 2014165828 A1 | 10/2014 | |
| WO | 2015052629 A1 | 4/2015 | |
| WO | 2015110542 A1 | 7/2015 | |
| WO | WO-2016066287 A1 * | 5/2016 | ............. A61B 34/20 |
| WO | 2017144115 A1 | 8/2017 | |
| WO | 2018189729 A1 | 10/2018 | |
| WO | 2019096933 A2 | 5/2019 | |
| WO | 2019108567 A1 | 6/2019 | |
| WO | 2019130100 A1 | 7/2019 | |
| WO | 2019150086 A1 | 8/2019 | |
| WO | 2019150111 A1 | 8/2019 | |
| WO | 2019195841 A1 | 10/2019 | |
| WO | 2020264489 A1 | 12/2020 | |
| WO | 2021003401 A1 | 1/2021 | |
| WO | 2021011646 A2 | 1/2021 | |
| WO | 2021084484 A2 | 5/2021 | |

OTHER PUBLICATIONS

Bateman, D.A., "Adjustable Mirror Mount Design Using Kinematic Principles" Dip. Tech.—Royal Aircraft Establishment—Technical Report No. 66349, Nov. 1966. U.D.C. No. 621.3-21: 531.1: 681.4. 28 pages.

Culpepper, Martin L. et al., "Design of Low-Cost Kinematic Couplings Using Formed Balls and Grooves in Sheet Metal Parts", (Massachusetts Institute of Technology, Cambridge, MA, Oct. 2003, 4 pages.

English language abstract for WO 2009/092701 extracted from espacenet.com database on Nov. 12, 2018, 2 pages.

English language abstract for WO 2013/159932 extracted from espacenet.com database on Nov. 12, 2018, 2 pages.

(56) References Cited

OTHER PUBLICATIONS

Furse, J.E., "Instrument Science and Technology" Kinematic design of fine mechanisms in instruments, Engineering Services, National Physical Laboratory, Teddington, Middlesex, UK, J. Phys. E: Sci. Instrum., vol. 14, 1981, 8 pages.
Hale, Layton C. et al., "Optimal Design Techniques for Kinematic Couplings", Precision Engineering Journal of the International Societies for Precision Engineering and Nanotechnology 25 (2001) 114-127, 14 pages.
International Search Report for International Application No. PCT/US2016/018691 mailed Jun. 1, 2016, 3 pages.
Slocum, Alexander, "Design of three-grove kinematic couplings", Department of Mechanical Engineering, Massachusetts Institute of Technology, Cambridge, MA, USA, 1992, Butterworth-Heinemann, 10 pages.

\* cited by examiner

ROBOTIC SYSTEM INCLUDING A LINK TRACKER

CROSS-REFERENCE TO RELATED APPLICATIONS

The subject application claims priority to and all the benefits of U.S. Provisional Patent Application No. 63/315,665, filed 2 Mar. 2022, the entire contents of which are hereby incorporated by reference.

TECHNICAL FIELD

The present disclosure relates generally to systems and methods for tracking components of a surgical robot system.

BACKGROUND

Robotic devices are commonly used to assist in the performance of surgical procedures. A robotic device typically includes a moveable arm that supports an end effector which interacts with a surgical site. Conventionally, the robotic arm is coupled to a moving cart which provides a kinematic base of the robotic device.

Many surgical robotic systems are designed to be used with surgical navigation systems that track the end effector relative to the surgical site. To enable the navigation system to understand the relationship between the end effector and the base, the navigation system conventionally tracks a position of the base using a cart tracker is coupled to the cart by a manually-adjustable setup arm. However, this configuration has many disadvantages. For instance, the adjustable arm adds complexity to design of the system by requiring additional components. The adjustable arm and the cart tracker are also bulky and susceptible to damage or collisions with people or other objects. For the same reason, the adjustable arm and cart tracker are physical obstacles in the operating room and during transport of the cart. Furthermore, a user must manually assemble/disassemble the cart tracker and adjustable arm before/after a procedure. After the user manually sets up the adjustable arm and the cart tracker, the cart tracker may be in any number of unique poses. Therefore, the cart tracker requires a separate, intraoperative, calibration to enable the navigation system to locate the unique pose at which the cart tracker was setup. Additionally, the adjustable arm or the cart tracker may lose its original pose due to a collision, such as from the manipulator or any other source. This lost pose will compromise the cart tracker registration, thereby requiring a time-consuming re-registration. Moreover, because the cart tracker is physically separated and spaced apart from the robotic device, the navigation system is more susceptible to losing line-of-sight with the cart tracker due to obstructions, such as an obstruction from the robotic device itself. Additionally, the conventional cart tracker is typically only a single tracking array that is located in a fixed "setup" pose and capable only of unidirectional communication to the navigation system. Hence, the cart tracker does not provide the possibility to dynamically adjust its pose or control for any change in condition without requiring additional setup and re-registration. The adjustable arm and cart tracker also add complexity to the draping of the robotic device and maintaining of a sterile field due to the articulation of the adjustable arm from the cart, the bulkiness of the adjustable arm and cart tracker, and the connection that must be made between the cart tracker and the adjustable arm.

SUMMARY

According to a first aspect, a surgical robotic system is provided, which includes a base; and a robotic arm coupled to the base and comprising: a plurality of links with each link defining a link surface; a plurality of joints configured to enable movement of the plurality of links; a mounting interface configured to receive an end effector; and a photosensor assembly located on the link surface of at least one link of the plurality of links.

According to a second aspect, a surgical robotic system is provided, which includes a base; and a robotic arm coupled to the base and comprising: a plurality of links with each link defining a link surface; a plurality of joints configured to enable movement of the plurality of links; a mounting interface configured to receive an end effector; and a link tracker assembly located on the link surface of at least one link of the plurality of links; and the end effector coupled to the mounting interface of the robotic arm, and wherein the end effector comprises an end effector tracker.

According to a third aspect, a navigation system is provided, which includes a link tracker assembly, wherein the link tracker assembly is coupled to a surgical robotic system comprising a base and a robotic arm coupled to the base, the robotic arm comprising a plurality of links with each link defining a link surface and a plurality of joints configured to enable movement of the plurality of links, and a mounting interface configured to receive an end effector, and wherein the link tracker assembly is located on the link surface of at least one link of the plurality of links; an end effector tracker, wherein the end effector tracker is coupled to the end effector that is coupled to the mounting interface of the robotic arm; and a localizer configured to track the link tracker assembly and the end effector tracker.

According to a fourth aspect, a surgical robotic system is provided, which includes a base comprising a base tracker; and a robotic arm coupled to the base and comprising: a plurality of links with each link defining a link surface; a plurality of joints configured to enable movement of the plurality of links; a mounting interface configured to receive an end effector; and a link tracker assembly located on the link surface of at least one link of the plurality of links.

According to a fifth aspect, a navigation system is provided, which includes a link tracker assembly, wherein the link tracker assembly is coupled to a surgical robotic system comprising a base and a robotic arm coupled to the base, the robotic arm comprising a plurality of links with each link defining a link surface and a plurality of joints configured to enable movement of the plurality of links, and a mounting interface configured to receive an end effector, and wherein the link tracker assembly is located on the link surface of at least one link of the plurality of links; a base tracker, wherein the base tracker is coupled to the base; and a localizer configured to track at least one of the link tracker assembly and the base tracker.

According to a sixth aspect, a surgical robotic system is provided, which includes a base comprising a base tracker; and a robotic arm coupled to the base and comprising: a plurality of links with each link defining a link surface; a plurality of joints configured to enable movement of the plurality of links; a mounting interface configured to receive an end effector; and a link tracker assembly located on the link surface of at least one link of the plurality of links; and the end effector coupled to the mounting interface of the robotic arm, and wherein the end effector comprises an end effector tracker.

According to a seventh aspect, a navigation system is provided, which includes a link tracker assembly, wherein the link tracker assembly is coupled to a surgical robotic system comprising a base and a robotic arm coupled to the base, the robotic arm comprising a plurality of links with each link defining a link surface and a plurality of joints configured to enable movement of the plurality of links, and a mounting interface configured to receive an end effector, and wherein the link tracker assembly is located on the link surface of at least one link of the plurality of links; a base tracker, wherein the base tracker is coupled to the base; an end effector tracker, wherein the end effector tracker is coupled to the end effector that is coupled to the mounting interface of the robotic arm; and a localizer configured to track the end effector tracker and at least one of the link tracker assembly and the base tracker.

According to an eighth aspect, a tracker assembly is provided, which includes a tracker assembly configured to be removably coupled to a link of an arm of a surgical robotic system, the tracker assembly comprising: a tracking element; a tracker container defining a void arranged to receive the tracking element and comprising an interface configured to attached to the link of the arm; and a cap configured to couple to the tracker container to capture the tracking element within the container.

According to a ninth aspect, a surgical robotic system is provided, which includes a base; and a robotic arm coupled to the base and comprising: a plurality of links with each link defining a link surface; a plurality of joints configured to enable movement of the plurality of links; and a link tracker assembly located on the link surface of at least one link of the plurality of links, and wherein the link tracker assembly is formed by a plurality of tracker assemblies that are configured to be removably coupled to the link, and wherein each tracker assembly comprises: a tracking element; a tracker container defining a void arranged to receive the tracking element and comprising an interface configured to attached to the at least one link; and a cap configured to couple to the tracker container to capture the tracking element within the container.

According to a tenth aspect, a surgical robotic system is provided, which includes a base; a robotic arm coupled to the base and comprising: a plurality of links with each link defining a link surface; a plurality of joints configured to enable movement of the plurality of links; and a link tracker assembly configured to be assembled relative to the link surface of at least one link of the plurality of links, and wherein the link tracker assembly is formed by optical tracking elements that are configured to be removably coupled to the at least one link.

According to an eleventh aspect, a method of configuring a robotic surgical system is provided, the robotic system including a base; a robotic arm coupled to the base and comprising: a plurality of links with each link defining a link surface; a plurality of joints configured to enable movement of the plurality of links; a link tracker assembly configured to be assembled relative to the link surface of at least one link of the plurality of links, and the link tracker assembly is formed by optical tracking elements that are configured to be removably coupled to the at least one link, and a drape, the method comprising: draping the robotic arm; and after draping, assembling the link tracker assembly relative to the link surface by coupling each of the optical tracking elements relative to the at least one link such that a material of the drape is captured between each optical tracking element and the at least one link.

Any of the above aspects can be combined in part or in whole with any other aspect. Any of the above aspects, whether combined in part or in whole, can be further combined with any of the following implementations, in full or in part.

In some implementations, the at least one link comprises a photosensor assembly located on the link surface. In some implementations, the photosensor assembly includes: a photosensor base defining a void; a photodiode unit disposed in the void; and a photosensor filter disposed on the photodiode unit. In some implementations, the photosensor base is disposed between the link surface and the photodiode unit. In some implementations, a platform extends above the link surface and the platform defines a bore and the photosensor assembly is disposed in the bore. In some implementations, the bore of the platform has a first threaded interface and the photosensor filter has a second threaded interface configured to engage the first threaded interface to secure the photosensor assembly to the platform. In some implementations, the bore of the platform is disposed at an interior angle with respect to the link surface and the photosensor assembly disposed in the bore is presented at the interior angle with respect to the link surface. In some implementations, the interior angle at which the bore is disposed is greater than 15 degrees and less than 35 degrees, and optionally a value at or between 0 and 90 degrees. In some implementations, the at least one link defines a longitudinal axis, the photosensor assembly is further defined as a first photosensor assembly, and the robotic arm further comprises a second photosensor assembly and a third photosensor located on the link surface of the at least one link. In some implementations, the each of the first, second, and third photosensor assemblies are located on the link surface at a different location from one another about the longitudinal axis. In some implementations, at least two of the first, second, and third photosensor assemblies are located on the link surface 90 degrees apart about the longitudinal axis. In some implementations, at least two of the first, second, and third photosensor assemblies are located on the link surface 180 degrees apart about the longitudinal axis. In some implementations, the at least two of the first, second, and third photosensor assemblies that are located on the link surface 180 degrees apart about the longitudinal axis are further located on the link surface at a common location along the longitudinal axis. In some implementations, at least two of the first, second, and third photosensor assemblies are located on the link surface at a different location from one another along the longitudinal axis. In some implementations, the at least one link of the plurality of links having the photosensor assembly located on the link surface thereof is the longest link among the plurality of links. In some implementations, photosensor assemblies are located on any number of links. In some implementations, the robotic arm comprises exactly six links and the at least one link having the photosensor assembly located on the link surface thereof is the second link from the base.

In some implementations, the at least one link comprises a tracker assembly located on the link surface. In some implementations, a controller is coupled to the photosensor assembly and the tracker assembly located on the link surface. In some implementations, the controller is configured to control the tracker assembly based on a signal received by the photosensor assembly. In some implementations, the link tracker assembly is further defined as a first link tracker assembly, and the robotic arm further comprises second and third link tracker assemblies located on the link surface of the at least one link. In some implementations, each of the first, second, and third link tracker assemblies comprises a plurality of optical tracking elements arranged in a tracking geometry on the link surface. In some implementations, the tracking geometry of each of the first, second, and third link tracker assemblies are different from one another. In some implementations, each of the first, second, and third link tracker assemblies comprises exactly four tracker assemblies. In some implementations, any of the link tracker assemblies comprise three tracker assemblies. In some implementations, the at least one link defines a longitudinal axis, which can be the axis about which the at least one link is configured to rotate or any axis along the length of the link. In some implementations, the tracking geometry of each of the first, second, and third link tracker assemblies are located on the link surface at a different location from one another about the longitudinal axis or along the longitudinal axis. In some implementations, the tracking geometries of at least two of the first, second, and third link tracker assemblies are located on the link surface 90 degrees apart about the longitudinal axis. In some implementations, the tracking geometries of at least two of the first, second, and third link tracker assemblies are located on the link surface 180 degrees apart about the longitudinal axis. In some implementations any two or more link tracker assemblies can be spaced 15, 30, 45, 60, 75, 90, 120 degrees apart, or any range between 10-180 degrees apart. In some implementations, the tracking geometry of each of the first, second, and third link tracker assemblies comprises exactly four optical tracking elements. In some implementations, the link tracker assembly comprises a plurality of optical tracking elements arranged in a tracking geometry. In some implementations, a plurality of platforms extend above the link surface and each of the optical tracking elements is disposed on one of the platforms. In some implementations, each platform defines a planar surface. In some implementations, each optical tracking element is disposed at an interior angle relative to the planar surface of the platform on which the optical tracking element is disposed. In some implementations, the interior angle is greater than 45 degrees and less than 85 degrees. In some implementations, the interior angle is greater than 15 degrees and less than 120 degrees. In some implementations, the at least one link of the plurality of links having the link tracker assembly located on the link surface thereof is the longest link among the plurality of links. In some implementations, the robotic arm comprises exactly six links and the at least one link having the link tracker assembly located on the link surface thereof is the second link from the base. In some implementations, one or more link tracker assemblies can be located on the link surface of any number of links or all of the plurality of links.

In some implementations, the base is coupled to a mobile cart and the mobile cart comprises a plurality of wheels. In some implementations, an end effector comprises an end effector body including a second mounting interface being configured to couple to the mounting interface of the robot arm. In some implementations, an end effector tracker is included, and the end effector tracker is coupled to the end effector that is coupled to the mounting interface of the robotic arm. In some implementations, the end effector tracker comprises one or a plurality of optical tracking elements that are integrated into the end effector body. In some implementations, the base further comprises a base tracker. In some implementations, the base tracker comprises a plurality of optical tracking elements arranged in a second tracking geometry. In some implementations, an adjustable arm is coupled to the mobile cart and is configured to support the base tracker. In some implementations, the adjustable arm comprises an arm interface and the base tracker comprises a tracker interface and the arm interface and the tracker interface are configured to couple to one another.

In some implementations, the localizer is configured to transmit a signal to the photosensor assembly. In some implementations, a controller is coupled to the photosensor assembly and the link tracker assembly. In some implementations, the controller is configured to control the link tracker assembly based on the signal received by the photosensor assembly. In some implementations, the signal transmitted by the localizer includes an instruction to initialize the link tracker assembly. In some implementations, the end effector tracker is uncontrolled and non-initialized by the localizer. In some implementations, the localizer is configured to track each of the first, second, and third link tracker assemblies. In some implementations, the tracking geometry of each of the first, second, and third link tracker assemblies are further respectively defined as a first, second, and third tracking geometry. In some implementations, the navigation system further comprises a first, second and third photosensor assembly located on the link surface of the at least one link. In some implementations, the first photosensor assembly is located within a perimeter of the first tracking geometry, the second photosensor assembly is located within a perimeter of the second tracking geometry, and the third photosensor assembly is located within a perimeter of the third tracking geometry. In some implementations, the localizer is configured to transmit a signal to any one or more of the first, second, and third photosensor assemblies. In some implementations, a controller is coupled to the first, second, and third photosensor assemblies and the first, second, and third link tracker assemblies. In some implementations, the controller is configured to control any one or more of the link tracker assemblies based on the signal received by any one or more of the first, second and third photosensor assemblies. In some implementations, the localizer is configured to detect an obstruction to a line-of-sight between the localizer and any one of the first, second, and third link tracker assemblies. In some implementations, the localizer is configured to transmit the signal to any one or more of the first, second, and third photosensor assemblies to activate another one of the first, second, and third link tracker assemblies for which the line-of-sight between the localizer is unobstructed. In some implementations, the localizer is configured to combine the plurality of optical tracking elements of the link assembly tracker and the at least one optical tracking element of the end effector tracker to establish a tracking geometry. In some implementations, the localizer is configured to track the link tracker assembly and end effector tracker by tracking the tracking geometry. In some implementations, the localizer is configured to track the base tracker. In some implementations, a controller is coupled to the photosensor assembly and the link tracker assembly. In some implementations, the controller is configured to control the link tracker assembly based on signal received by the photosensor assembly. In some implementations, the localizer is configured to control activation of the link tracker through the photosensor assembly. In some implementations, the base tracker comprises a sensor configured to receive a signal from the localizer. In some implementations, a controller coupled to the sensor to control the base tracker based on the signal. In some implementations, the localizer is configured to selectively control activation of the link tracker assembly and the base tracker. In some implementations, a user interface configured to receive a user input is included, and the localizer is configured to selectively control activation of the link tracker assembly and the base tracker based on the user input. In some implementations, the localizer is configured to deactivate the base tracker when the localizer activates the link tracker assembly. In some implementations, localizer is configured to deactivate the link tracker assembly when the localizer activates the base tracker. In some implementations, the localizer is configured to detect an obstruction to a line-of-sight between the localizer and the link tracker assembly. In some implementations, the localizer is configured to transmit the signal to the sensor of the base tracker to activate and establish line-of-sight with the base tracker. In some implementations, the localizer is configured to detect an obstruction to a line-of-sight between the localizer and the base tracker. In some implementations, the localizer is configured to transmit the signal to the photosensor assembly to activate and establish line-of-sight with the link tracker assembly. In some implementations, the localizer is configured to detect an obstruction to a line-of-sight between the localizer and any one of the link tracker assemblies. In some implementations, the localizer is configured to transmit the signal to any one or more of the photosensor assemblies to activate another one of the link tracker assemblies for which the line-of-sight between the localizer is unobstructed. In some implementations, the localizer is configured to combine the tracking geometries of the link assembly tracker and the end effector tracker to establish a tracking geometry. In some implementations, the localizer is configured to track the link tracker assembly and end effector tracker by tracking the combined tracking geometry. In some implementations, the localizer is coupled to a non-transitory memory configured to store a predetermined data defining a known relationship between the link tracker assembly relative to the base. In some implementations, the localizer determines a relationship of the base tracker relative to the base by being configured to combine: a relationship between the base tracker assembly relative to the link tracker assembly; and the known relationship between the link tracker assembly relative to the base.

In some implementations, the tracking element is an active and optical tracking element, including, but not limited to a light emitting diode. In some implementations, the tracking element is a passive and optical tracking element, such as, but not limited to, a retro-reflective tracking element, such as a reflective tracking ball or disc. In some implementations, a cap is arranged to removably couple to the tracker container. In some implementations, the tracker container includes a threaded portion arranged to engage complementary threads of the cap to removably couple the cap to the tracker container. In some implementations, the cap includes a central aperture and the tracking element is visible through the aperture when the cap is coupled to the tracker container. In some implementations, at least a portion of the tracking element protrudes through the central aperture when the cap is coupled to the tracker container. In some implementations, the interface of the tracker container includes a threaded portion arranged to engage complementary threads defined by the link of the arm. In some implementations, a washer disposed between the tracking element and the cap to insulate the tracking element from the cap. In some implementations, the washer includes a locating feature protruding from the washer. In some implementations, the tracking container includes a recess arranged to receive the locating feature. In some implementations, the tracking container restricts relative rotation of the washer when the locating feature is engaged by the recess. In some implementations, the tracking element includes a locating feature protruding from the tracking element; the tracking container includes a slot arranged to receive the locating feature. In some implementations, the tracking container restricts relative rotation of the tracking element when the locating feature is engaged by the slot. In some implementations, a sleeve surrounding the tracking element and being configured to be disposed within the tracking container is included. In some implementations, the sleeve includes a slot arranged to receive the locating feature of the tracking element. In some implementations, the at least one link defines a first threaded interface. In some implementations, the interface of the tracker container includes a second threaded interface configured to engage the first threaded interface for securing the tracker assembly to the at least one link. In some implementations, the at least one link defines a bore in the link surface wherein the bore is configured to receive one of the tracker assemblies and wherein the bore defines the first threaded interface. In some implementations, a plurality of platforms extend above the link surface and each platform defines a bore configured to receive one of the tracker assemblies. In some implementations, each platform defines a planar surface, and each tracker assembly is disposed at an interior angle relative to the planar surface of the platform on which the tracker assembly is disposed.

In some implementations, a plurality of posts extend from the link surface and each post is configured to connect with one or more of the optical tracking elements. In some implementations, a plurality of bores are defined within the link surface and each of the optical tracking elements comprise a base that is configured to be inserted within and secured to the bore. In some implementations, a drape is configured to cover the robotic arm, and the optical tracking elements are configured to be coupled to the link before or after the robotic arm is covered with the drape. In some implementations, the connection between the optical tracking element and a respective connection feature on the link may trap the drape therebetween without puncturing the drape. In some implementations, the optical tracking elements are configured to be coupled to the link using a magnetic connection. In some implementations, the optical tracking elements are configured to be coupled to the link using the magnetic connection to enable placement of the optical tracking elements relative to any portion of the robotic arm and to create a customized, user-defined, geometry for the link tracker assembly.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION

I. Example System Overview

Referring to the Figures, wherein like numerals indicate like or corresponding parts throughout the several views, a surgical robotic system (hereinafter "system") 10 and method for operating the same are shown throughout.

Figure 1:
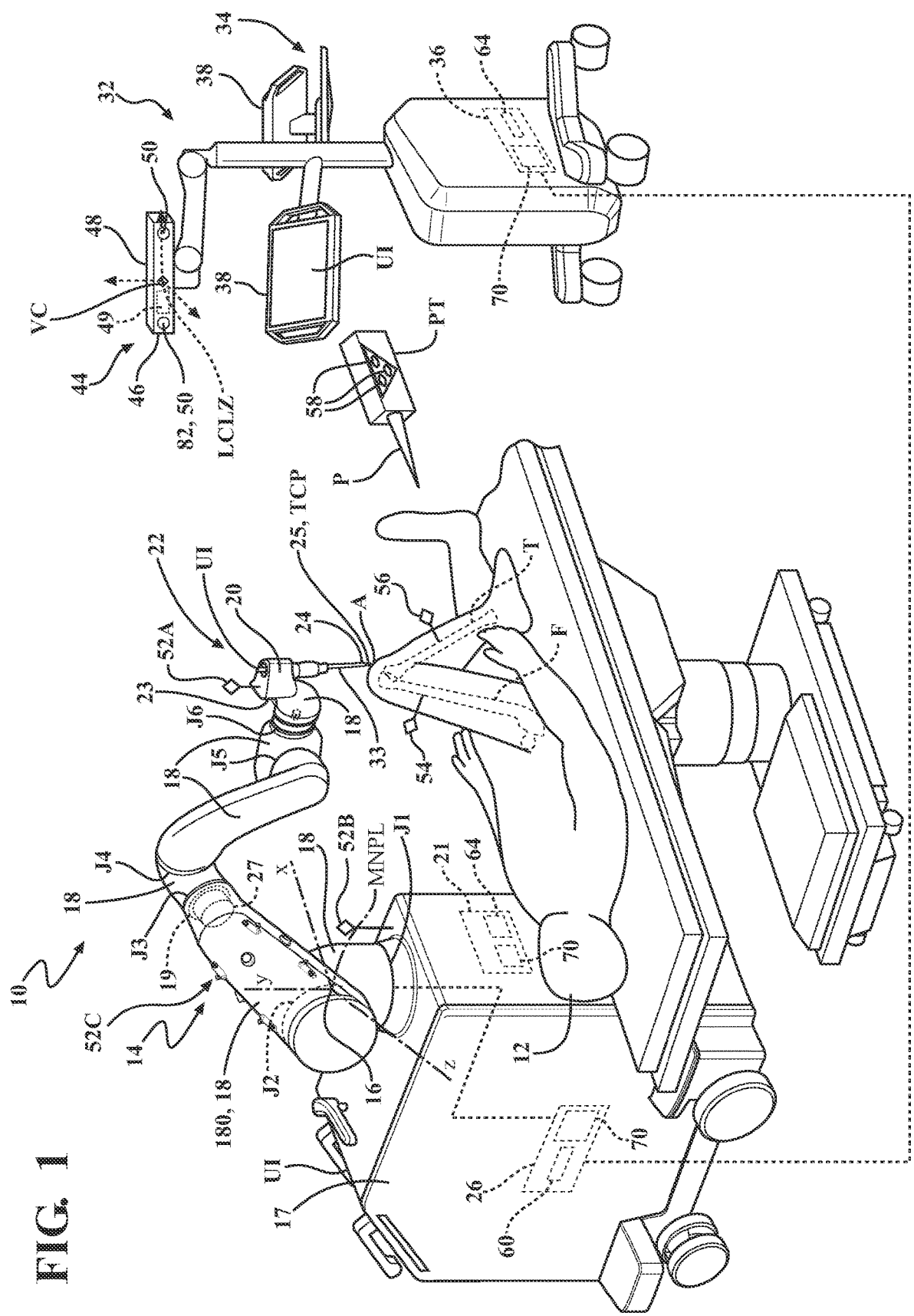
FIG. 1 is a perspective view of one implementation of a surgical system comprising a robotic manipulator and a navigation system including a localization device.

Referring to FIG. 1, a surgical robotic system 10 is illustrated. The system 10 is useful for treating a surgical site or anatomical volume (A) of a patient 12, such as treating bone or soft tissue. In FIG. 1, the patient 12 is undergoing a surgical procedure. The anatomy in FIG. 1 includes a femur F and a tibia T of the patient 12. The surgical procedure may involve tissue removal or other forms of treatment. Treatment may include cutting, coagulating, lesioning the tissue, other in-situ tissue treatments, or the like. In some examples, the surgical procedure involves partial or total knee or hip replacement surgery, shoulder replacement surgery, spine surgery, or ankle surgery. In some examples, the system 10 is designed to cut away material to be replaced by surgical implants, such as hip and knee implants, including unicompartmental, bicompartmental, multicompartmental, or total knee implants. Some of these types of implants are shown in U.S. Patent Application Publication No. 2012/0330429, entitled, "Prosthetic Implant and Method of Implantation," the disclosure of which is hereby incorporated by reference. The system 10 and techniques disclosed herein may be used to perform other procedures, surgical or non-surgical. The system 10 may be used in industrial (non-surgical) applications or other applications where robotic systems are utilized.

The system 10 includes a (robotic) manipulator 14. The manipulator 14 has a base 16 and plurality of links 18. A manipulator cart 17 supports the manipulator 14 such that the manipulator 14 is supported by the manipulator cart 17. The links 18 collectively form one or more arms of the manipulator 14. In some implementations, and as further described below, one or more of the links 18 is a trackable link 180 and includes tracking elements such as optical tracking elements and photosensors. The manipulator 14 may have a serial arm configuration (as shown in FIG. 1), a parallel arm configuration, or any other suitable manipulator configuration. In other examples, more than one manipulator 14 may be utilized in a multiple arm configuration.

In the example shown in FIG. 1, the manipulator 14 comprises a plurality of joints J and a plurality of joint encoders 19 located at the joints J for determining position data of the joints J. For simplicity, only one joint encoder 19 is illustrated in FIG. 1, although other joint encoders 19 may be similarly illustrated. The manipulator 14 according to one example has six joints J1-J6 implementing at least six-degrees of freedom (DOF) for the manipulator 14. However, the manipulator 14 may have any number of degrees of freedom and may have any suitable number of joints J and may have redundant joints. In one example, the manipulator 14 can have a configuration such as the robotic manipulator described in U.S. Pat. No. 10,327,849, entitled "Robotic System and Method for Backdriving the Same", the contents of which are hereby incorporated by reference in its entirety.

The manipulator 14 need not require joint encoders 19 but may alternatively, or additionally, utilize motor encoders present on motors at each joint J. Also, the manipulator 14 need not require rotary joints, but may alternatively, or additionally, utilize one or more prismatic joints. Any suitable combination of joint types are contemplated.

The base 16 of the manipulator 14 is generally a portion of the manipulator 14 that provides a fixed reference coordinate system for other components of the manipulator 14 or the system 10 in general. Generally, the origin of a manipulator coordinate system MNPL is defined at the fixed reference of the base 16. The base 16 may be defined with respect to any suitable portion of the manipulator 14, such as one or more of the links 18. Alternatively, or additionally, the base 16 may be defined with respect to the manipulator cart 17, such as where the manipulator 14 is physically attached to the manipulator cart 17. In one example, the base 16 is defined at an intersection of the axes of joints J1 and J2. Thus, although joints J1 and J2 are moving components in reality, the intersection of the axes of joints J1 and J2 is nevertheless a virtual fixed reference pose, which provides both a fixed position and orientation reference and which does not move relative to the manipulator 14 and/or manipulator cart 17. In other examples, the manipulator 14 can be a hand-held manipulator where the base 16 is a base portion of a tool (e.g., a portion held free-hand by a user) and the tool tip is movable relative to the base portion. The base portion has a reference coordinate system that is tracked and the tool tip has a tool tip coordinate system that is computed relative to the reference coordinate system (e.g., via motor and/or joint encoders and forward kinematic calculations). Movement of the tool tip can be controlled to follow the path since its pose relative to the path can be determined.

The manipulator 14 and/or manipulator cart 17 house a manipulator controller 26, or other type of control unit. The manipulator controller 26 may comprise one or more computers, or any other suitable form of controller that directs the motion of the manipulator 14. The manipulator controller 26 may have a central processing unit (CPU) and/or other processors, memory, and storage. The manipulator controller 26 is loaded with software as described below. The processors could include one or more processors to control operation of the manipulator 14. The processors can be any type of microprocessor, multi-processor, and/or multi-core processing system. The manipulator controller 26 may additionally, or alternatively, comprise one or more microcontrollers, field programmable gate arrays, systems on a chip, discrete circuitry, and/or other suitable hardware, software, or firmware that is capable of carrying out the functions described herein. The term processor is not intended to limit any implementation to a single processor. The manipulator 14 may also comprise a user interface UI with one or more displays and/or input devices (e.g., push buttons, keyboard, mouse, microphone (voice-activation), gesture control devices, touchscreens, etc.).

A tool 20 couples to the manipulator 14 and is movable relative to the base 16 to interact with the anatomy in certain modes. The tool 20 is a physical and surgical tool and is or forms part of an end effector 22 supported by the manipulator 14 in certain implementations. More specifically, the manipulator 14 may include a first mounting interface configured to removably receive the end effector 22. In order to secure to the first mounting interface, the end effector 22 may include an end effector body 23 which includes a second mounting interface configured to couple to the first mounting interface. The tool 20 may be grasped by the user. One possible arrangement of the manipulator 14 and the tool 20 is described in U.S. Pat. No. 9,119,655, entitled, "Surgical Manipulator Capable of Controlling a Surgical Instrument in Multiple Modes," the disclosure of which is hereby incorporated by reference. The manipulator 14 and the tool 20 may be arranged in alternative configurations. The tool 20 can be like that shown in U.S. Pat. No. 9,566,121, filed on Mar. 15, 2014, entitled, "End Effector of a Surgical Robotic Manipulator," hereby incorporated by reference.

The tool 20 may include an energy applicator 24 designed to contact and remove the tissue of the patient 12 at the surgical site. In one example, the energy applicator 24 is a bur 25. The bur 25 may be substantially spherical and comprise a spherical center, radius (r) and diameter. Alternatively, the energy applicator 24 may be a drill bit, a saw blade, an ultrasonic vibrating tip, or the like. The tool 20 and/or energy applicator 24 may comprise any geometric feature, e.g., perimeter, circumference, radius, diameter, width, length, volume, area, surface/plane, range of motion envelope (along any one or more axes), etc. The geometric feature may be considered to determine how to locate the tool 20 relative to the tissue at the surgical site to perform the desired treatment. In some of the implementations described herein, a spherical bur having a tool center point (TCP) will be described for convenience and ease of illustration, but is not intended to limit the tool 20 to any particular form.

The tool 20 may comprise a tool controller 21 to control operation of the tool 20, such as to control power to the tool (e.g., to a rotary motor of the tool 20), control movement of the tool 20, control irrigation/aspiration of the tool 20, and/or the like. The tool controller 21 may be in communication with the manipulator controller 26 or other components. The tool 20 may also comprise a user interface UI with one or more displays and/or input devices (e.g., push buttons, keyboard, mouse, microphone (voice-activation), gesture control devices, touchscreens, etc.). The manipulator controller 26 controls a state (position and/or orientation) of the tool 20 (e.g., the TCP) with respect to a coordinate system, such as the manipulator coordinate system MNPL. The manipulator controller 26 can control (linear or angular) velocity, acceleration, or other derivatives of motion of the tool 20.

The tool center point (TCP), in one example, is a predetermined reference point defined at the energy applicator 24. The TCP has a known, or able to be calculated (i.e., not necessarily static), pose relative to other coordinate systems. The geometry of the energy applicator 24 is known in or defined relative to a TCP coordinate system. The TCP may be located at the spherical center of the bur 25 of the tool 20 such that only one point is tracked. The TCP may be defined in various ways depending on the configuration of the energy applicator 24. The manipulator 14 could employ the joint/motor encoders, or any other non-encoder position sensing method, to enable a pose of the TCP to be determined. The manipulator 14 may use joint measurements to determine TCP pose and/or could employ techniques to measure TCP pose directly. The control of the tool 20 is not limited to a center point. For example, any suitable primitives, meshes, etc., can be used to represent the tool 20.

The system 10 further includes a navigation system 32. One example of the navigation system 32 is described in U.S. Pat. No. 9,008,757, entitled, "Navigation System Including Optical and Non-Optical Sensors," hereby incorporated by reference. The navigation system 32 tracks movement of various objects. Such objects include, for example, the manipulator 14, the tool 20 and the anatomy, e.g., femur F and tibia T. The navigation system 32 tracks these objects to gather state information of each object with respect to a (navigation) localizer coordinate system LCLZ. Coordinates in the localizer coordinate system LCLZ may be transformed to the manipulator coordinate system MNPL, and/or vice-versa, using transformations.

The navigation system 32 includes a cart assembly 34 that houses a navigation controller 36, and/or other types of control units. A navigation user interface UI is in operative communication with the navigation controller 36. The navigation user interface includes one or more displays 38. The navigation system 32 is capable of displaying a graphical representation of the relative states of the tracked objects to the user using the one or more displays 38. The navigation user interface UI further comprises one or more input devices to input information into the navigation controller 36 or otherwise to select/control certain aspects of the navigation controller 36. Such input devices include interactive touchscreen displays. However, the input devices may include any one or more of push buttons, a keyboard, a mouse, a microphone (voice-activation), gesture control devices, and the like.

The navigation system 32 also includes a navigation localizer 44 coupled to the navigation controller 36. The relative location of the localizer 44 with respect to the manipulator 14 in FIG. 1 is provided only for illustrative purposes to show the respective components and is not necessarily representative of the optimal manner in which to setup the localizer 44. In one example, the localizer 44 is an optical localizer and includes a camera unit 46. The camera unit 46 has an outer casing 48 that houses one or more optical sensors 50. The localizer 44 may comprise its own localizer controller 49 and may further comprise a video camera VC. The localization device 44 may include an IR transmitter 82 configured to send and receive infrared (IR) signals. The IR transmitter 82 is in communication with the localizer controller 49 such that signals received by the IR transmitter 82 can be relayed to the localizer controller 49. As described in more detail below, the IR transmitter 82 may be in communication with the various trackers utilized by the surgical robotic system 10. Any IR communications from the localizer 44 may originate from the IR transmitter 82.

The navigation system 32 includes one or more trackers. In one example, the trackers include a pointer tracker PT, one or more robotic or tool trackers 52A, 52B, 52C a first patient tracker 54, and a second patient tracker 56. The first patient tracker 54 is firmly affixed to the femur F of the patient 12, and the second patient tracker 56 is firmly affixed to the tibia T of the patient 12. In this example, the patient trackers 54, 56 are firmly affixed to sections of bone. The pointer tracker PT is firmly affixed to a pointer P used for registering the anatomy to the localizer coordinate system LCLZ.

The tracker 52A, herein referred to as an end effector tracker 52A, may be secured to any part of the end effector 22. For example, the end effector tracker 52A may be secured to the end effector body 23 or the tool 20. In addition, the end effector tracker 52A may be integrated into the end effector 22 or one of the mounting interfaces. For example, the end effector tracker 52A may comprise one tracking element (e.g., light emitting diode or passive reflective tracking element) or a plurality of tracking elements integrated into or coupled to the end effector body 23. The tracking elements may be arranged in an EE tracking geometry such that the localizer 44 can differentiate the end effector tracker 52A from the other tracker 52B, 52C, 54, 56, PT based on the EE tracking geometry. The end effector tracker 52A may further include a sensor (e.g., a photosensor) configured to receive signals from the localizer 44 such that the localizer 44 can control the end effector tracker 52A.

The tracker 52B, herein referred to as a base tracker 52B, may be movably and/or stowably secured to the base 16. For example, the base 16 may further include an adjustable arm configured to support the base tracker 52B. The adjustable arm may include a tracker interface configured to couple to the base tracker 52B. The adjustable arm may be pivotably secured to the base 16 at a connection point such that the adjustable arm may be moved between a stowed position and various deployed positions. The adjustable arm may be considered to be in the stowed position when it is folded flat up against the base 16, and the adjustable arm may be considered to be in one of the deployed positions when it is pivoted about the connection point so as to form an angle with the side of the base 16. Such as arrangement allows the base tracker 52B to be coupled to the adjustable arm at the tracker interface and moved relative to the base 16 until the tracker 52B is in a desired position. The base tracker 52B may further include a sensor (e.g., a photosensor) configured to receive signals from the localizer 44 such that the localizer 44 can control the base tracker 52B.

Tracker 52C is one of the link trackers that is coupled to the link 18. Tracker 52C will be described in detail below in the next section. However, any of the description herein related to the navigation system 32, localizer 44, and other trackers can be fully applied to the link tracker 52C.

The localizer 44 may need to initialize the trackers 52A, 52B, 52C at the request of the user, procedure, or the navigation system 32. Alternatively, any one or more of the trackers 52A, 52B, 52C may comprise controllers to recognize, based on signals, or in response to any other condition, when the respective tracker 52 should be initialized. In other examples, any of the trackers 52 may be active and ready so long as power is provided to the tracker. For instance, the end effector tracker 52A may only include one or more activated optical tracking elements and not have a component or a controller configured to receive signals from the localizer 44. Since the end effector tracker 52A may not be able to receive communications from the localizer 44 in this example, the tracker 52A can be enabled at all times or otherwise controlled by the user via the various user interfaces UI.

Any one or more of the trackers 52A, 52B, 52C, 54, 56, PT may include active tracking elements 58. The active tracking elements 58 may be optical and may include light emitting diodes (LEDs). The LEDs may be configured to provide tracking information to the navigation system 32, and the photosensors may be configured to receive signals from the navigation system 32. Alternatively or additionally, the trackers 52A, 52B, 52C, 54, 56, PT may have passive tracking elements, such as reflectors, which reflect light emitted from the camera unit 46 or other source. In other examples, any or all of the trackers 52A, 52B, 52C, 54, 56, PT may utilize a combination of active and passive tracking elements. Other suitable tracking elements not specifically described herein may be utilized. Any one or more of the trackers 52A, 52B, 52C, 54, 56, PT may include photosensors or infrared receivers to receive control signals from the navigation system 32.

The localizer 44 tracks the trackers 52A, 52B, 52C, 54, 56, PT to determine a state of each of the trackers 52A, 52B, 52C, 54, 56, PT, which correspond respectively to the state of the object respectively attached thereto. The localizer 44 may perform triangulation techniques to determine the states of the trackers 52, 54, 56, PT, and associated objects. The localizer 44 provides the state of the trackers 52A, 52B, 52C, 54, 56, PT to the navigation controller 36. In one example, the navigation controller 36 determines and communicates the state the trackers 52A, 52B, 52C, 54, 56, PT to the manipulator controller 26. As used herein, the state of an object includes, but is not limited to, data that defines the position and/or orientation of the tracked object or equivalents/derivatives of the position and/or orientation. For example, the state may be a pose of the object, and may include linear velocity data, and/or angular velocity data, and the like.

The navigation controller 36 may comprise one or more computers, or any other suitable form of controller. The navigation controller 36 has a central processing unit (CPU) and/or other processors, memory (not shown), and storage (not shown). The processors can be any type of processor, microprocessor, or multi-processor system. The navigation controller 36 is loaded with software. The software, for example, converts the signals received from the localizer 44 into data representative of the position and orientation of the objects being tracked. The navigation controller 36 may additionally, or alternatively, comprise one or more microcontrollers, field programmable gate arrays, systems on a chip, discrete circuitry, and/or other suitable hardware, software, or firmware that is capable of carrying out the functions described herein.

Although one example of the navigation system 32 is shown that employs triangulation techniques to determine object states, the navigation system 32 may have any other suitable configuration for tracking the manipulator 14, the tool 20, and/or the patient 12.

In another example, the navigation system 32 and/or localizer 44 are radio frequency (RF)-based. For example, the navigation system 32 may comprise an RF transceiver coupled to the navigation controller 36. The manipulator 14, the tool 20, and/or the patient 12 may comprise RF emitters or transponders attached thereto. The RF emitters or transponders may be passive or actively energized. The RF transceiver transmits an RF tracking signal and generates state signals to the navigation controller 36 based on RF signals received from the RF emitters. The navigation controller 36 may analyze the received RF signals to associate relative states thereto. The RF signals may be of any suitable frequency. The RF transceiver may be positioned at any suitable location to track the objects using RF signals effectively. Furthermore, the RF emitters or transponders may have any suitable structural configuration that may be much different than the trackers 52A, 52B, 52C, 54, 56, PT shown in FIG. 1.

In another example, the navigation system 32 and/or localizer 44 are electromagnetically based. For example, the navigation system 32 may comprise an EM transceiver coupled to the navigation controller 36. The manipulator 14, the tool 20, and/or the patient 12 may comprise EM components attached thereto, such as any suitable magnetic tracker, electro-magnetic tracker, inductive tracker, or the like. The trackers may be passive or actively energized. The EM transceiver generates an EM field and generates state signals to the navigation controller 36 based upon EM signals received from the trackers. The navigation controller 36 may analyze the received EM signals to associate relative states thereto. Again, such navigation system 32 examples may have structural configurations that are different than the navigation system 32 configuration shown in FIG. 1.

In yet another example, the navigation system 32 and/or localizer 44 are machine vision/computer vision based. For example, the navigation system 32 may comprise a machine or computer vision camera coupled to the navigation controller 36. The manipulator 14, the tool 20, and/or the patient 12 may comprise machine/computer vision detectable elements attached thereto, such as any suitable pattern, color, barcode, QR code, or the like. Here, "color" refers to the frequency of the machine/computer vision detectable element and includes colors outside the visible spectrum (e.g., non-visible light such as infrared light). The machine/computer vision detectable element may also be multi-spectrum light. The vision detectable elements may be passive or actively energized. The navigation controller 36 may analyze image and/or depth data from the vision detectable elements to associate relative states thereto. Again, such navigation system 32 examples may have structural configurations that are different than the navigation system 32 configuration shown in FIG. 1.

The navigation system 32 can use any combination of the above-described localization techniques. The navigation system 32 may have any other suitable components or structure not specifically recited herein. Furthermore, any of the techniques, methods, and/or components described above with respect to the navigation system 32 shown may be implemented or provided for any of the other examples of the navigation system 32 described herein.

Figure 2:
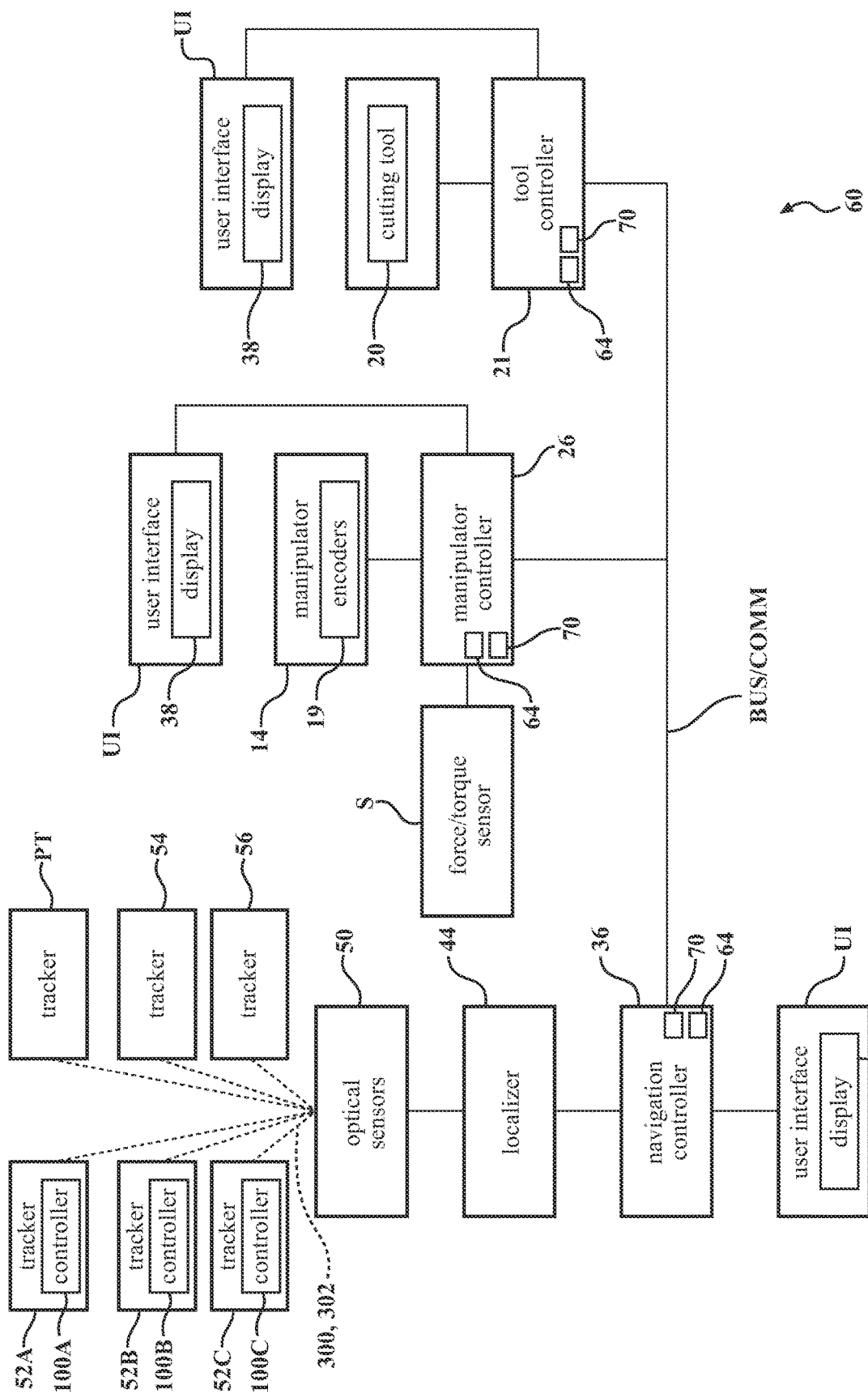
FIG. 2 is a block diagram of a control system for controlling the surgical system, according to one implementation.

Referring to FIG. 2, the system 10 may include a control system 60 that comprises, among other components, the manipulator controller 26, the navigation controller 36, and the tool controller 21. The control system 60 may further include one or more software programs and software modules shown in FIG. 3. The software modules may be part of the program or programs that operate on the manipulator controller 26, navigation controller 36, tool controller 21, or any combination thereof, to process data to assist with control of the system 10. The software programs and/or modules include computer readable instructions stored in non-transitory memory 64 on the manipulator controller 26, navigation controller 36, tool controller 21, or a combination thereof, to be executed by one or more processors 70 of the controllers 21, 26, 36. The memory 64 may be any suitable configuration of memory, such as RAM, non-volatile memory, etc., and may be implemented locally or from a remote database. Additionally, software modules for prompting and/or communicating with the user may form part of the program or programs and may include instructions stored in memory 64 on the manipulator controller 26, navigation controller 36, tool controller 21, or any combination thereof. The user may interact with any of the input devices of the navigation user interface UI or other user interface UI to communicate with the software modules. The user interface software may run on a separate device from the manipulator controller 26, navigation controller 36, and/or tool controller 21.

The control system 60 may comprise any suitable configuration of input, output, and processing devices suitable for carrying out the functions and methods described herein. The control system 60 may comprise the manipulator controller 26, the navigation controller 36, or the tool controller 21, or any combination thereof, or may comprise only one of these controllers. These controllers may communicate via a wired bus or communication network as shown in FIG. 2, via wireless communication, or otherwise. The control system 60 may also be referred to as a controller. The control system 60 may comprise one or more microcontrollers, field programmable gate arrays, systems on a chip, discrete circuitry, sensors, displays, user interfaces, indicators, and/or other suitable hardware, software, or firmware that is capable of carrying out the functions described herein.

Figure 3:
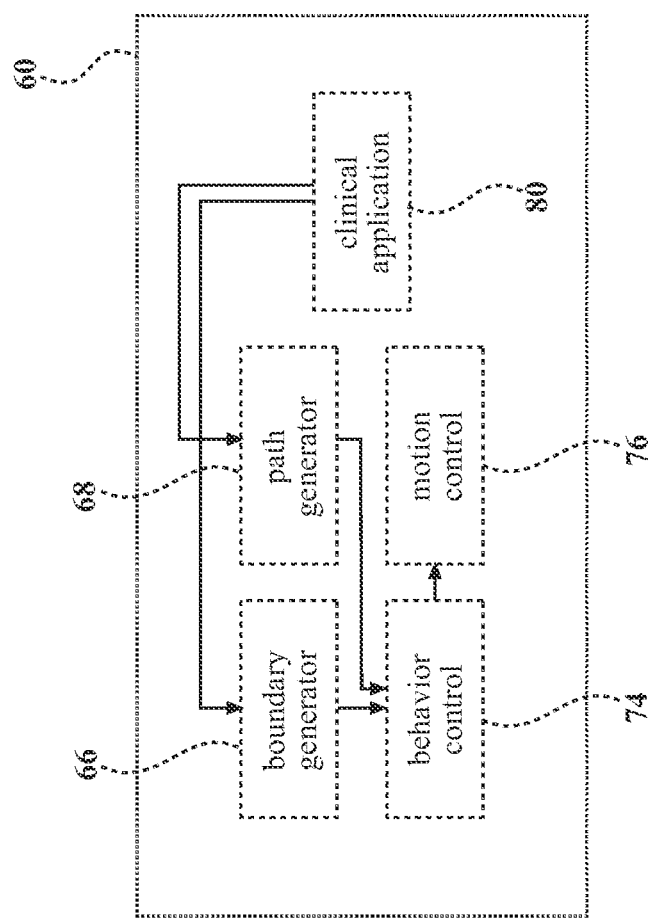
FIG. 3 is a functional block diagram of a software program for controlling the surgical system, according to one implementation.

Referring to FIG. 3, the software employed by the control system 60 may include a boundary generator 66 and a path generator 68. The boundary generator 66 is a software program or module that generates a virtual boundary for constraining movement and/or operation of the tool 20. The manipulator controller 26 and/or the navigation controller 36 tracks and/or controls/positions the state of the tool 20 relative to the virtual boundaries. To that end, the path generator 68 generates a milling/tool path for the tool 20 to traverse, such as for removing sections of the anatomy to receive an implant. In one example, the tool path is defined as a tissue removal path, but, in other versions, the tool path may be used for treatment other than tissue removal. The boundary generator 66 and the path generator 68 may each be implemented on the manipulator controller 26. Alternatively, the boundary generator 66 and/or the path generator 68 may be implemented on other components, such as the navigation controller 36. One example of a system and method for generating the virtual boundaries and/or the tool path is described in U.S. Pat. No. 9,119,655, entitled, "Surgical Manipulator Capable of Controlling a Surgical Instrument in Multiple Modes." Another example of such a system/method is described in U.S. Patent Publication No. 2020/0281676, entitled, "Systems and Methods for Controlling Movement of a Surgical Tool Along a Predefined Path." The disclosures of both of which are hereby incorporated by reference.

Referring back to FIG. 3, two additional software programs or modules may be run on the manipulator controller 26 and/or the navigation controller 36. One software module performs behavior control 74. Behavior control 74 is the process of computing data that indicates the next commanded position and/or orientation (e.g., pose) for the tool 20. Output from the boundary generator 66, the path generator 68, and a force/torque sensor S (coupled between the end effector and the manipulator) may feed as inputs into the behavior control 74 to determine the next commanded position and/or orientation for the tool 20. The behavior control 74 may process these inputs, along with one or more virtual constraints described further below, to determine the commanded pose. The second software module performs motion control 76. One aspect of motion control is the control of the manipulator 14. The motion control 76 receives data defining the next commanded pose from the behavior control 74. Based on these data, the motion control 76 determines the next position of the joint angles of the joints J of the manipulator 14 (e.g., via inverse kinematics and Jacobian calculators) so that the manipulator 14 is able to position the tool 20 as commanded by the behavior control 74, e.g., at the commanded pose. One example of the software modules 74, 76 is described in U.S. Patent Publication No. 2020/0281676, incorporated above.

Additionally, the user interface UI can be a clinical application 80 provided to handle user interaction. The clinical application 80 handles many aspects of user interaction and coordinates the surgical workflow, including pre-operative planning, implant placement, registration, bone preparation visualization, post-operative evaluation of implant fit, and navigation settings, control, calibration, validation, etc. The clinical application 80 is configured to be output to the displays 38. The clinical application 80 may run on its own separate processor or may run alongside the navigation controller 36. An example of the clinical application 80 is described in U.S. Patent Publication No. 2020/0281676, incorporated above.

The system 10 may operate in a manual mode, such as described in U.S. Pat. No. 9,119,655, incorporated above. Here, the user manually directs, and the manipulator 14 executes movement of the tool 20 and its energy applicator 24 at the surgical site. The user physically contacts the tool 20 to cause movement of the tool 20 in the manual mode. In one version, the manipulator 14 monitors forces and torques placed on the tool 20 by the user in order to position the tool 20. For example, the manipulator 14 may comprise the force/torque sensor S that detects the forces and torques applied by the user and generates corresponding input used by the control system 60 (e.g., one or more corresponding input/output signals).

The force/torque sensor S may comprise a 6-DOF force/torque transducer. The manipulator controller 26 and/or the navigation controller 36 receives the input (e.g., signals) from the force/torque sensor S. In response to the user-applied forces and torques, the manipulator 14 moves the tool 20 in a manner that emulates the movement that would have occurred based on the forces and torques applied by the user. Movement of the tool 20 in the manual mode may also be constrained in relation to the virtual boundaries generated by the boundary generator 66. In some versions, measurements taken by the force/torque sensor S are transformed from a force/torque coordinate system FT of the force/torque sensor S to another coordinate system, such as a virtual mass coordinate system VM in which a virtual simulation is carried out on the virtual rigid body model of the tool 20 so that the forces and torques can be virtually applied to the virtual rigid body in the virtual simulation to ultimately determine how those forces and torques (among other inputs) would affect movement of the virtual rigid body, as described below.

The system 10 may also operate in a semi-autonomous mode in which the manipulator 14 moves the tool 20 along the milling path (e.g., the active joints J of the manipulator 14 operate to move the tool 20 without requiring force/torque on the tool 20 from the user). An example of operation in the semi-autonomous mode is also described in U.S. Pat. No. 9,119,655, incorporated above. In some implementations, when the manipulator 14 operates in the semi-autonomous mode, the manipulator 14 is capable of moving the tool 20 free of user assistance. Free of user assistance may mean that a user does not physically contact the tool 20 to move the tool 20. Instead, the user may use some form of remote control to control starting and stopping of movement. For example, the user may hold down a button of the remote control to start movement of the tool 20 and release the button to stop movement of the tool 20. The system 10 may also operate in a fully automated mode wherein the manipulator 14 is capable of moving the tool 20 free of user assistance or override.

The system 10 may also operate in a guided-manual mode to remove the remaining subvolumes of bone, or for other purposes. An example of operation in the guided-manual mode is also described in U.S. Patent Publication No. 2020/0281676, incorporated above. In this mode, aspects of control used in both the manual mode and the semi-autonomous mode are utilized. For example, forces and torques applied by the user are detected by the force/torque sensor S to determine an external force $F_{ext}$. The external force $F_{ext}$ may comprise other forces and torques, aside from those applied by the user, such as gravity-compensating forces, backdrive forces, and the like, as described in U.S. Pat. No. 9,119,655, incorporated above. Thus, the user-applied forces and torques at least partially define the external force $F_{ext}$, and in some cases, may fully define the external force $F_{ext}$. Additionally, in the guided-manual mode, the system 10 utilizes a milling path (or other tool path) generated by the path generator 68 to help guide movement of the tool 20 along the milling path.

II. Robot Link Tracking and Techniques

A. Example Advantages

Described in this section are system, methods, components, and techniques related to navigation (e.g., navigated tracking and navigation communication or control) with one more trackable links 180 of the manipulator 14. These techniques can be used in conjunction with the base tracker 52B and/or the end effector tracker 52A to provide synergistic technical benefits.

Advantages of the trackable link 180 include but are not limited to the following: (1) the trackable link 180 can substitute for the base tracker 52B thereby providing tracking the base 16 of the manipulator 14 without additional components (e.g., an adjustable base tracker arm) and without requiring the additional steps of having a user manually setup/take down or assemble/disassemble the base tracker 52B; (2) the trackable link 180 can provide a known reference to the base 16 that is known to the navigation system without requiring a separate, intraoperative, calibration of the base tracker 52B which depends on the unique position in which the user sets up the base tracker 52B; (3) unlike the base tracker 52B, which is fixed, the trackable link 180 is moveable and therefore configured to provide optimal visibility to or communication from the localizer 44 for any position of the manipulator 14 arm; (4) the trackable link 180 avoids line-of-sight errors that may occur for the base tracker 52B because the link 18 itself is tracked, whereas the separate base tracker 52B may be obstructed by the link 18; (5) the trackable link 180 can be controlled to dynamically change which tracking assemblies are activated based on any predetermined or intraoperatively detected condition such as: choosing the optimal line-of-sight, in response to user settings or preferences, and/or in response to a chosen surgical procedure, type of procedure, step of a procedure, location of surgeon or patient, a detected collision with the manipulator, location of the manipulator or its links, location of the tool, or the like, which can be predetermined or intraoperatively determined conditions; (6) the trackable link 180 has tracking elements and photosensors 62 that are seamlessly compatible with draping of the robotic arm; (7) the trackable link 180 can comprise photosensors 62 directly on the link for enabling communication directly between the localizer 44 and the link; (8) the trackable link 180 has components (e.g., tracking assemblies and photosensors 62) that are modular and removable to provide easy sterilization and repair, if necessary; (9) in some implementations, the components (e.g., tracking assemblies and photosensors) of the trackable link 180 can be provided on only one link of the manipulator 14 and can be installable into the surface of the link 180 thereby not adversely impacting with physical configuration of the manipulator 14 (or link surface) or operation thereof; (10) the trackable link 180 has components (e.g., tracking assemblies and photosensors 62) that can be spaced about the link surface and angled relative to the link surface to enable spatial diversity in localizer 44 detection or communication; (11) the trackable link 180 has a configuration that seamlessly integrates with the workflow of the surgical procedure; (12) the tracking geometries of the tracking assemblies can be combined, in part, or in full, for any purpose or condition, such as: partial or lost visibility of a tracking assembly due to line of sight obstruction or component error/failure; redundancy in tracking; determining or confirming a pose of the robotic arm relative to kinematic data, or the like; and (13) any one or more of the photosensors can provide input to the controller for controlling any one or more of the tracking assemblies for any purpose or condition, such as: partial visibility or lost communication with one photosensor due to line of sight obstruction or component error/failure; redundancy in communication with the localizer 44, or the like.

When used in conjunction with the base tracker 52B, advantages of the trackable link 180 include but are not limited to the following: (1) the trackable link 180 can provide redundancy in case of system errors or line-of-sight visibility obstruction to the base tracker 52B, or vice-versa; (2) the navigation system can dynamically switch between tracking the base tracker 52B and the trackable link 180 for any other reason, including: choosing the optimal line-of-sight for any given condition or moment, user settings or preferences, a chosen type of surgical procedure, starting or ending of a surgical step, location of patient or staff, a detected collision with the manipulator or base tracker, a type of tool or end effector, location of the base tracker, location of the end effector or tool, location of the manipulator or any of its links, or the like, any of which can be predetermined or intraoperatively determined conditions, and the navigation system can anticipate presence of these condition to predictively switch between the tracking the base tracker 52B and the trackable link 180 before the condition occurs; (3) the navigation system can combine tracking geometries of the link tracker 180 and the base tracker 52B for many reasons, such as confirming base tracker 52B setup, confirming link tracker 180 operation, providing redundant or high-accuracy tracking of the base 16, or the like; (4) knowing the location of the trackable link 180 relative to the base 16, the navigation system can compute a transform between the trackable link 180 and the base tracker 52B to determine any pose of the base tracker 52B relative to the base 16, and can do so without user calibration of the base tracker 52B.

When used in conjunction with the end effector tracker 52A, advantages of the trackable link 180 include but are not limited to the following: (1) the navigation system can combine tracking geometries of the link tracker 180 and the end effector tracker 52A for many reasons, such as confirming the pose of the end effector tracker 52A relative to the base 16; (2) determining whether deformation of the robotic arm is present and the measure of deformation to provide kinematic calibration of the robotic arm; (3) determining a kinematic relationship between the end effector or TCP relative to trackable link 180 or base 16; (4) determining information related to the end effector tracker 52A where the end effector tracker 52A is non-initialized and/or a single tracking element; (5) knowing the location of the trackable link 180 relative to the base 16, the navigation system can compute a transform between the end effector tracker 52A and the trackable link 180 to determine any pose of the end effector tracker 52A relative to the base 16, and can do so without user calibration of the end effector tracker 52A; (6) predicting, confirming, and/or calibrating the expected position of the TCP, the end effector tracker 52A, and/or the trackable link 180, 52C based on the kinematic relationship between the end effector 22 or TCP relative to trackable link 180 or base 16; and (7) the navigation system can dynamically switch between tracking the end effector tracker 52A and the trackable link 180 for any reason, including: choosing the optimal line-of-sight for any given condition or moment, user settings or preferences, a type of surgical procedure, start or ending of a surgical step, location of patient or staff, a collision with the manipulator or end effector, type of tool or end effector, location of the end effector or tool, location of the manipulator or its links, location of the link tracker 180 or end effector tracker 52A, or the like, any of which can be predetermined or intraoperatively determined conditions, and the navigation system can anticipate presence of these condition to predictively switch between the tracking the end effector tracker 52A and the trackable link 180 before the condition occurs.

Any of the advantages of the trackable link 180 and navigation system described above can be implemented in part or in full and can be implemented for different combinations for use with the base tracker 52B and end effector tracker 52A, where present. The techniques described herein will have other advantages as will be understood for the specification and drawings.

With reference to FIG. 2, the trackers 52A, 52B, 52C related to the robotic system are realized as the end effector tracker 52A, the base tracker 52B, and the trackable link 180, 52C. As described above, the end effector tracker 52A may be attached to or integrated in the end effector 22, the base tracker 52B may be attached to the base 16, and the trackable link 180, 52C may be attached to or integrated with any one or more links 18 of the manipulator 14. The trackers 52A, 52B, 52C may each controlled by a respective controller. As shown in FIG. 2, for example, the end effector tracker 52A may be controlled by an end effector controller 100A. Similarly, the base tracker 52B and the trackable link 180, 52C may be controlled by a base tracker controller 100B and a link tracker controller 100C, respectively. The trackable link 180, 52C may also be controlled by more than one link tracker controller 100C. As will be described in more detail below, the trackers 52A, 52B, 52C are in communication with the respective controller 100A, 100B, 100C, as well as the navigation system 32. Any of these controllers 100A, 100B, 100C, can be combined in some implementations to control any two or more of the trackers 52A, 52B, 52C. Additionally, the link tracker assembly 52C may be realized with or without one or both of the end effector tracker 52A and base tracker 52B.

B. Trackable Link

Figure 4:
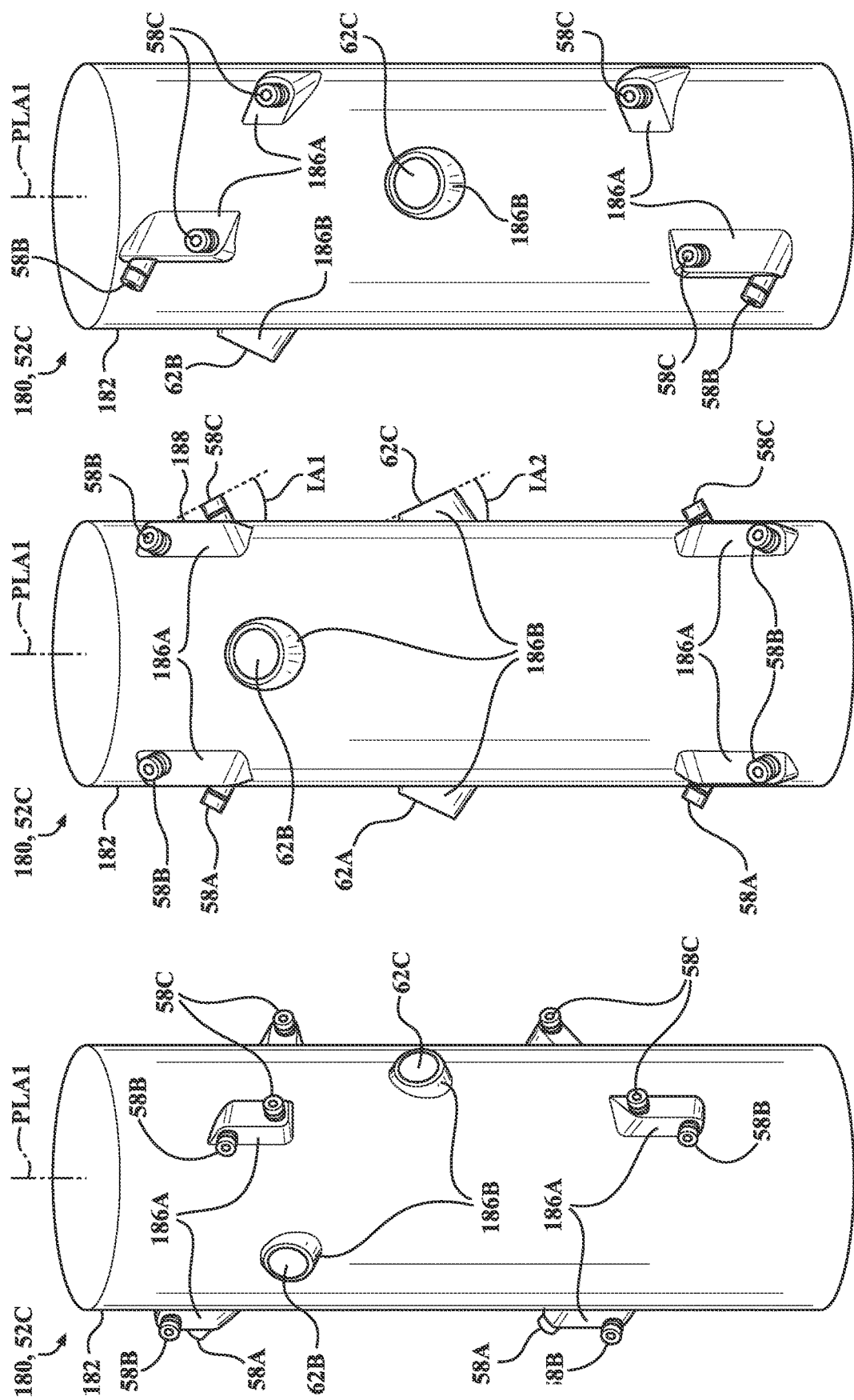
FIGS. 4A-4C are perspective views of a link of the robotic manipulator including a link tracker, according to one implementation.
Figure 5:
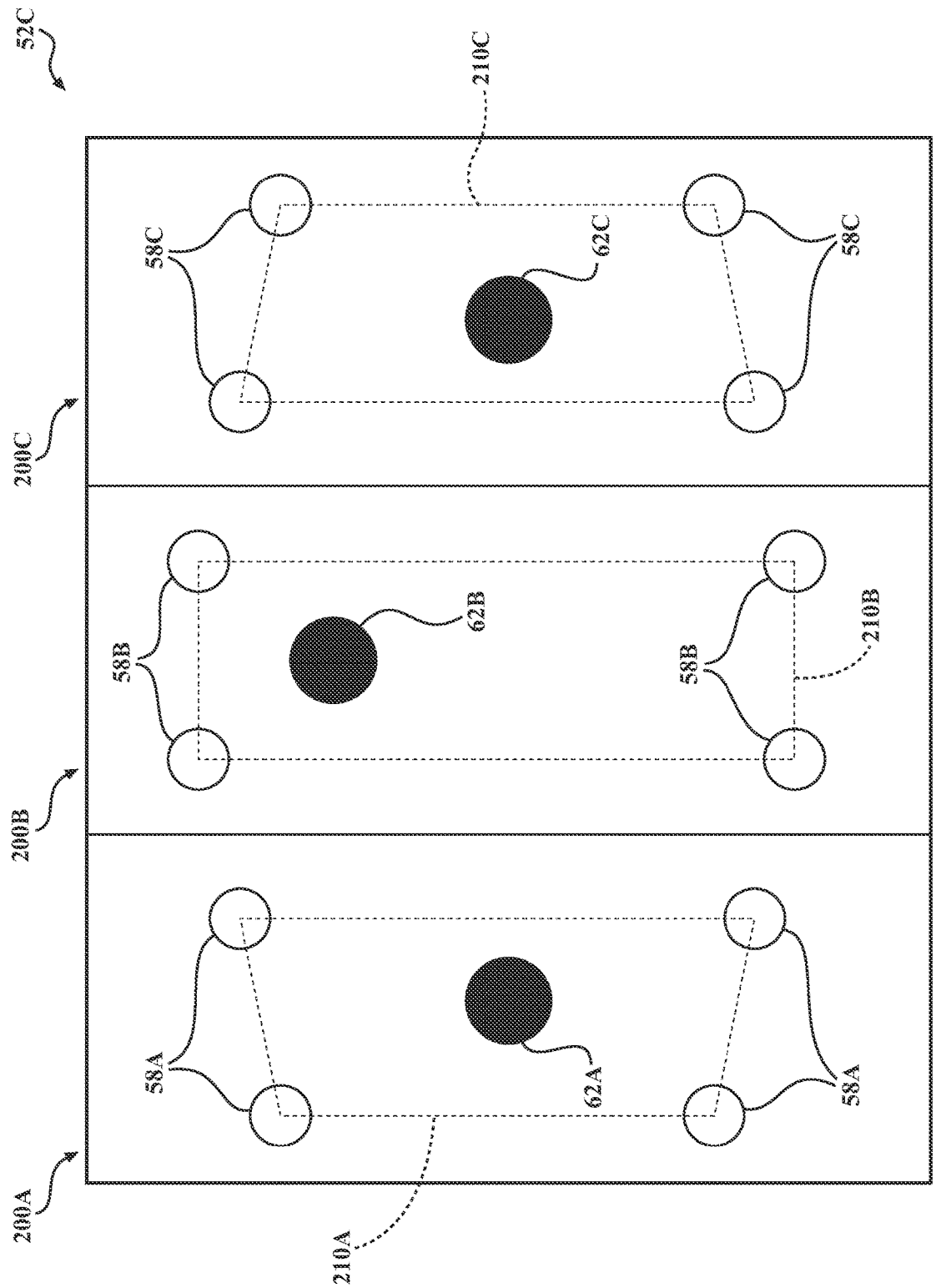
FIG. 5 is a schematic diagram layout link trackers and photosensors of a link of the robotic manipulator, according to one implementation.

Referring to FIGS. 4-5, one implementation of the trackable link 180 is provided. In the non-limiting illustrated implementation, the trackable link 180 has a first link tracker assembly 200A, a second link tracker assembly 200B, and a third link tracker assembly 200C. Although the link tracker assemblies 200A, 200B, 200C are discussed together, it is further contemplated to include one of the link tracker assemblies 200A, 200B, 200C on the trackable link 180, or to include two of the three link tracker assemblies 200A, 200B, 200C on the trackable link 180. Any reference to all three link tracker assemblies 200A, 200B, 200C may also apply to an implementation in which only one or two of the link tracker assemblies 200A, 200B, 200C are included on the trackable link 180.

Each link tracker assembly 200A, 200B, 200C includes any suitable number of optical tracking elements 58A, 58B, 58C. Again, these optical tracking elements may be active (e.g., LEDs) or passive (e.g., retro-reflective) elements.

In the illustrated example, each link tracker assembly 200A, 200B, 200C has four optical tracking elements 58A, 58B, 58C. Each link tracker assembly 200A, 200B, 200C optionally includes one photosensor 62A, 62B, 62C. It is further contemplated to use any number of photosensors 62. The optical tracking elements 58 and photosensor 62 are each in communication with one or more of the link tracker controllers 100C.

This trackable link 180 may be the longest link of the plurality of links 18. In some instances, the trackable link 180 is the second link from the base 16. Alternatively, the trackable link 180 can be the furthest downstream link from a distal portion of the manipulator 14 or the most proximal link to the base 16 of the manipulator 14. Any number of the links 18 of the manipulator can be tracked using the techniques described herein, including all of the links 18. Each of the link tracker assemblies 200A, 200B, 200C can be on the same trackable link 180, as shown, or may be respectively located on different links 18 of the manipulator.

The trackable link 180 further includes a link surface 182 defined by the surface of the trackable link 180. The link tracker assemblies 52C are located relative to the link surface 182 and can be spaced from one another about a longitudinal axis PLA1 of the link. When the link surface 182 is curved, the track assemblies 52C can be radially spaced about the longitudinal axis PLA1. The longitudinal axis PLA1 can be any reference axis through the body of the link 18. In some instances, the longitudinal axis PLA1 can be an axis about which the link 18 is configured to rotate, e.g., in the instance where opposing joints of the link are parallel. Recognizing that links 18 may have non-cylindrical shapes, the longitudinal axis PLA1 can likewise be any reference axis through a non-cylindrical link body. In some instances, the longitudinal axis PLA1 can extend from the center of one joint J of the link 18 to the center of the opposing joint J of the link 18. The longitudinal axis PLA1 can be straight, curved, curvilinear, or any other shape that follows the body of the link 18.

The link tracker assembly or assemblies 200 can be located on the link surface 182 according to any configuration that is suitable to provide visibility to the localizer 44. In the implementation shown, the link tracker assemblies 200A, 200B, 200C are located on or within the link surface 182 with each assembly 200A, 200B, 200C located 90 degrees apart about the longitudinal axis PLA1. As such, the first and third link tracker assemblies 200A, 200C are generally located 180 degrees apart about the longitudinal axis PLA1. The configuration of having three link tracker assembly 200A, 200B, 200C spaced in this manner can provide visibility to the localizer 44 for the entire range of motion of the manipulator 14. While it is contemplated to have a fourth link tracker assembly, this may not be desirable where this fourth link tracker is located on the surface of the manipulator 14 that is rarely visible as it is routinely obstructed by upstream links 18. It is further contemplated to space the link tracker assemblies 200A, 200B, 200C differently than explicitly shown in the figures. For example, one of the link tracker assemblies 200A, 200B, 200C may be spaced along the longitudinal axis PLA1 relative to one of the other link tracker assemblies 200A, 200B, 200C. The spacing of the link tracker assemblies 200 can be according to any other distance or angle, such as 60, 70, or 80 degrees.

A tracking geometry 210A, 210B, 210C, of each respective link tracker assembly 200A, 200B, 200C is defined by the optical tracking elements 58A, 58B, 58C of each link tracker assembly 200. For example, the tracking geometry 210A of link tracker assembly 200A is a virtual four-corner geometry defined by the four optical tracking elements 58A (shown as a dotted quadrilateral). The tracking geometries 210B and 210C can be similarly defined. In one implementation, the photosensors 62A, 62B, 62C are located within each respective tracking geometry 210A, 210B, 210C. The tracking geometry 210A, 210B, 210C of each of respective link tracker assembly 200A, 200B, 200C may be different from each other to enable the navigation system 32 to distinguish them apart. In other implementations, the tracking geometries 210A, 210B, 210C may be at least partially or totally identical, for example, if the link tracker assemblies 200 are spaced far enough apart or if the photosensor 62 can independently control each link tracker assembly 200. In one implementation, these tracking geometries 210A, 210B, 210C are spaced apart from one another, and do not overlap, to provide the localizer 44 visibility for every position of the trackable link 180. Alternatively, any of these tracking geometries 210A, 210B, 210C may overlap one another. Additionally, any of the tracking geometries 210A, 210B, 210C may be combined in part or in full. Additionally, the navigation system 32 may distinguish the tracking geometries 210A, 210B, 210C based on the surroundings relative to the tracking geometries 210A, 210B, 210C. For example, the navigation system 32 may distinguish the tracking geometries 210A, 210B, 210C based on the location of the tracking geometries 210A, 210B, 210C relative to the manipulator 14.

The photosensor 62 may be configured to receive a signal 300 from the navigation system 32. The signal 300 may be an infrared (IR) communication signal, but it is also contemplated to use other suitable forms of communication such as an electromagnetic or radio frequency signal. In response to receiving the signal 300, the photosensor 62 communicates with the link tracker controller 100C and the controller 100C controls the respective link tracker assembly 200A, 200B, 200C based on the signal 300. The signal 300 may include initialization information configured to selectively enable at least one of the link tracker assemblies 200A, 200B, 200C. In order to establish communication between the localizer 44 and at least one of the link tracker assemblies 200A, 200B, 200C, the IR transmitter 82 of the navigation system 32 may attempt to send the signal 300 to at least one of the photosensors 62A, 62B, 62C of the respective tracker assemblies 200A, 200B, 200C. After at least one of the photosensors 62 receives the signal 300, the optical tracking elements 58 of at least one of the link tracker assemblies 200 may be activated. For example, if the photosensor 62A included in the first link tracker assembly 200A receives the signal 300, the photosensor 62A may communicate with the corresponding link tracker controller 100C to enable the optical tracking elements 58A included in the first link tracker assembly 200A. After which, the localizer 44 may track the first link tracker assembly 200A and thus the trackable link 180 of the manipulator 14. Alternatively, any photosensor 62A, 62B, 62C, upon receiving the signal 300, can communicate with any link tracker controller 100C to initialize or control any number of optical tracking elements 58A, 58B, 58C of any given link tracker assembly 200A, 200B, 200C. Alternatively, each of the link tracker assemblies 200A, 200B, 200C can be in communication with a single link tracker controller 100C such that the link tracker controller 100C can collectively control each of the link tracker assemblies 200A, 200B, 200C.

In one implementation, the navigation system 32 may selectively enable the link tracker assemblies 200A, 200B, 200C based on line-of-sight visibility relative to the localizer 44. For example, the localizer 44 may attempt to send the signal 300 to the photosensors 62A, 62B, 62C associated with each link tracker assembly 200A, 200B, 200C and the photosensor(s) 62 that received the signal 300 may communicate with the link tracker controller 100C to then enable the optical tracking elements 58 associated with the photosensor(s) 62 that received the signal 300. After the optical tracking elements 58 are enabled, the localizer 44 determines which tracking geometry 210A, 210B, 210C is enabled and tracks the trackable link 180 accordingly.

If the tracking geometries 210A, 210B, 210C are substantially similar, the navigation system 32 can employ techniques to distinguish between these geometries. For example, the navigation system 32 can send unique identification or control data 302 to specific photosensors 62. For instance, if the photosensor 62A of the first link tracker assembly 200A received the data 302, the controller 100C can instruct the optical tracking elements 58A included in the first link tracker assembly 200A to behave in a unique manner (e.g., transmission frequency, transmission power, modulation type, change firing sequence of of the tracking elements, change color, etc.) so that the localizer 44 is then able to distinguish link tracker assembly 200A from the others. Alternatively, each link tracker assembly 200A, 200B, 200C can be preprogrammed to operate in a unique manner that is known to the navigation system 32.

C. Removable Tracker Assembly

Figure 6B:
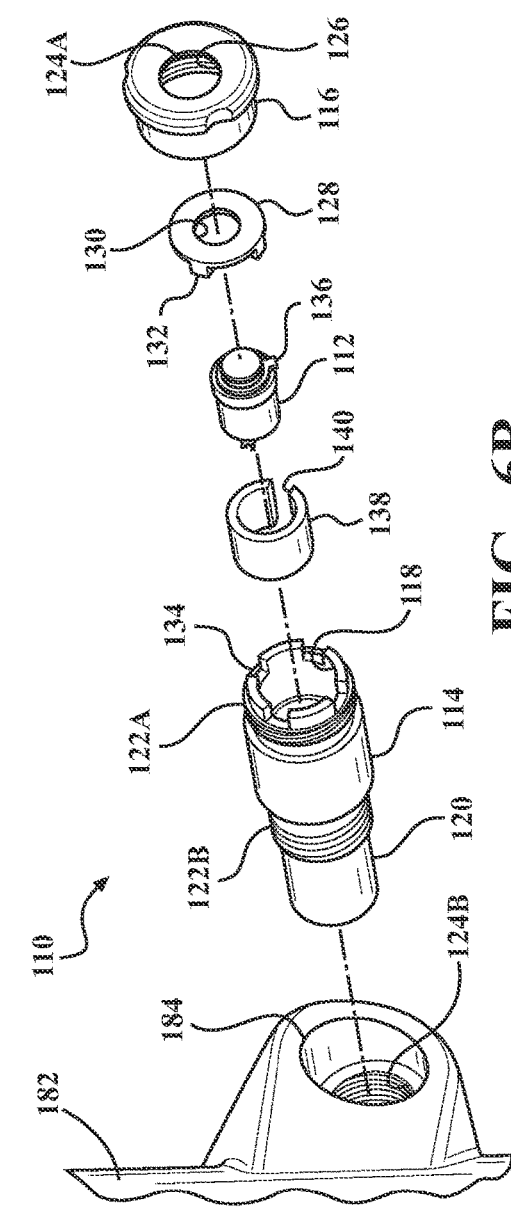
FIG. 6B is a partially exploded view, taken from FIG. 6A, of a modular light emitting diode assembly of the link tracker, according to one implementation.
Figure 6C:
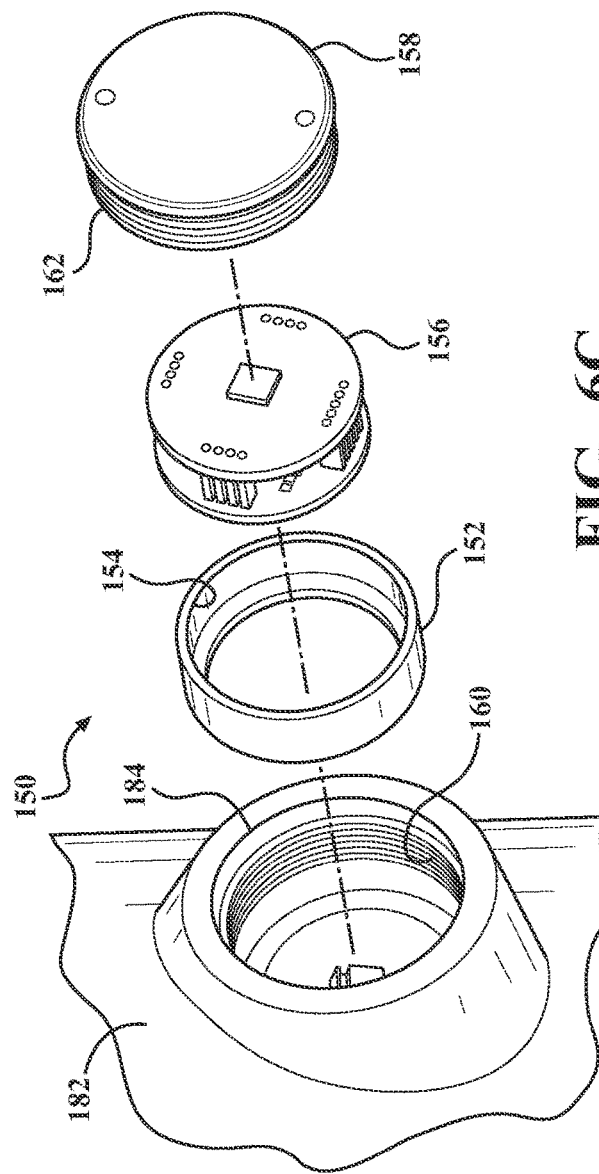
FIG. 6C is a partially exploded view, taken from FIG. 6A, of a modular photosensor assembly of the link, according to one implementation.
Figure 6A:
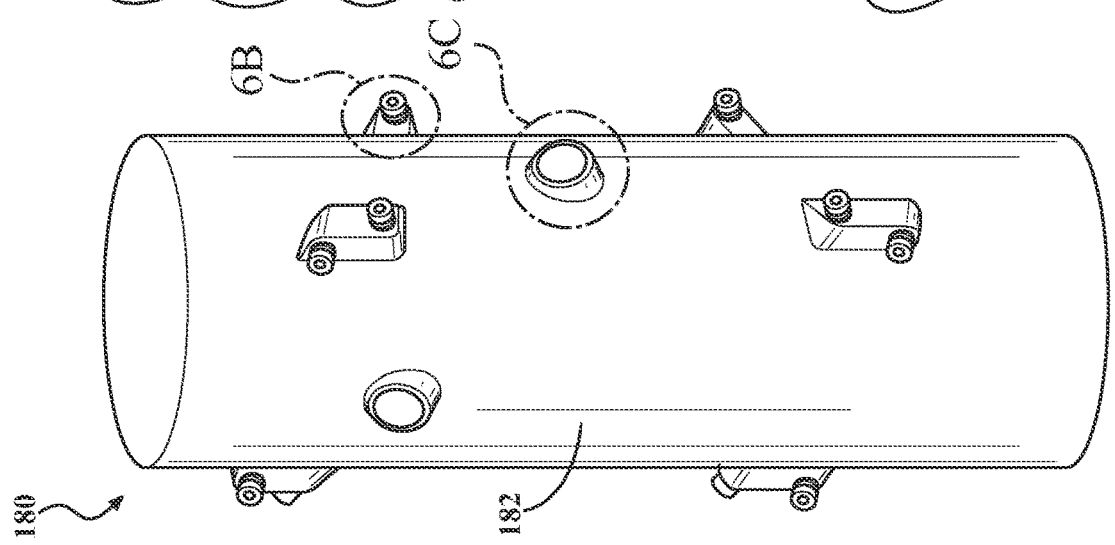
FIG. 6A is a perspective view of the link of the robotic manipulator including the link tracker, according to one implementation.

Referring to FIG. 6A-6B, a tracker assembly 110 is provided that is modular and attachable to/detachable from the one or more trackable links 180. This design assists in assembly and serviceability of the tracker trackable link 180. The tracking assembly 110 includes a tracking element 112 (e.g., passive or active optical tracking element 58A or other type of trackable element), a tracker container 114, and a cap 116. The tracker assembly 110 enables the optical tracking elements 58 to be easily replaced and/or removed with respect to the surface 182 of the one or more trackable links 180 of the manipulator 14. The tracker container 114 defines a void 118 arranged to receive the tracking element 112 and further includes an interface 120 configured to attach to one of the trackable links 180 of the manipulator 14. The cap 116 is configured to couple to the tracker container 114 and to therefore capture the tracking element 112 within the tracker container 114. To that end, the cap 116 may be removably coupled to the tracker container 114. In order to provide for such a coupling, the tracker container 114 may include a first threaded portion 122A arranged to engage complementary threads 124A of the cap 116. Similarly, in order to removably couple to the trackable link 180, the interface 120 of the tracker container 114 may include a second threaded portion 122B arranged to engage complementary threads 124B defined by the trackable link 180. For example, the trackable link 180 may define bores 184 arranged to receive the tracker assembly 110 and the bores 184 may include the complementary threads 124B. If the tracker assembly 110 is situated elsewhere on the surgical robotic system 10, the complementary threads 124B may be similarly situated and defined.

Even though the cap 116 is configured to capture the tracking element 112 within the tracker container 114, the cap 116 may further include a central aperture 126 so that the tracking element 112 is visible through the aperture 126 when the cap 116 is coupled to the tracker container 114. This enables the cap 116 to retain the tracking element 112 in the tracker container 114 while also avoiding inhibiting the localizer 44 from detecting the tracking element 112. Further, for similar reasons, at least a portion of the tracking element 112 may protrude through the central aperture 126 when the cap 116 is coupled to the tracker container 114.

The tracker assembly 110 may further include a washer 128 disposed between the tracking element 112 and the cap 116. When the first threaded portion 122A is moved into engagement with the complementary threads 124A, the washer 128 reduces the chance that the tracking element 112 rotates as the cap 116 is screwed onto the tracker container 114. In order to stop the washer 128 from rotating with the cap 116, the washer 128 may include locating features 132 protruding therefrom to make sure that the washer 128 is properly situated between the tracking element 112 and the cap 116. In such an implementation, the tracker container 114 includes recesses 134 arranged to receive the locating features 132. When the locating features 132 are received/engaged by the recesses 134, the tracker container 114 restricts rotation and displacement of the washer 128 relative to the tracker container 114. To avoid inhibiting the localizer 44 from detecting the tracking element 112, the washer 128 may include a central aperture 130 which aligns with the central aperture 126 of the cap 116 when the washer 128 is disposed between the tracking element 112 and the cap 116. The washer 128 and/or the cap 116 may also have a rough surface so to limit stray light coming from the tracking element 112. For example, the washer 128 and/or the cap 116 may have a fine bead blasted finish. Alternatively, the washer 128 and/or the cap 116 may have an anti-reflective coating or be formed of a material which has anti-reflective properties in order to limit stray light coming from the tracking element 112.

The tracking assembly 110 may further include a sleeve 138 shaped to surround the tracking element 112. The tracking element 112 may further include a locating feature 136 protruding from the tracking element 112. The locating feature 136 is arranged to be received by a slot 140 defined by the sleeve 138 such that the tracking element 112 is received by the void 118 in the tracker container 114 with the locating feature 136 aligned with the slot 140. The locating feature 136 may also include electrical connection components (e.g., wires) connecting the tracking element 112 to the link tracker controller 100C. Thus, the slot 140 enables the sleeve 138 to receive the tracking element 112 without impeding electrical connecting components. In addition, the sleeve 138 limits accidental rotation of the tracking element 112 relative to the tracker container 114 when the cap 116 is screwed onto the tracker container 114. As such, the sleeve 138 is shaped such that the cap 116 is urged against the sleeve 138 (as opposed to urged against the tracking element 112) when the cap 116 is screwed onto the tracker container 114.

The sleeve 138 is arranged to be disposed within the void 118 of the tracker container 114 and to receive the locating feature 136 of the tracking element 112. As will be appreciated from the figures, the sleeve 138 may be shaped to allow the tracking element 112 to better fit inside of the void 118 of the tracker container 114. For example, the tracker container 114 can be formed to receive tracking elements 112 of various sizes, and the sleeve 138 may be shaped to have a width substantially equal to the difference in radii between the tracking element 112 and the tracker container 114 such that the sleeve 138 fills any space between the tracking element 112 and the tracker container 114. Further, the sleeve 138 may be shaped so as to act as a stop for the tracking element 112. The stop function may include limiting axial and/or radial displacement of the tracking element 112.

If passive optical tracking elements 58 are utilized, the tracker assembly 110 may provide a connection mechanism for facilitating quick and easy attachment/detachment of the passive optical tracking element 58 relative to the body of the link 180. For instance, the link 180 may comprise a plurality of posts extending from the surface 182 of the link 180. The posts may comprise a connection feature at a distal end of the post to facilitate connection/disconnection with a corresponding connection feature on the passive optical tracking element 58. For instance, connection feature of the post may include an external/internal threaded interface that engages with a respective internal/external threaded interface on the passive optical tracking element 58. The passive optical tracking element 58 may be a retro-reflective ball or disc that is threaded onto the post and secured thereto. In other examples, the connection between the post and the passive optical tracking element 58 may be implemented by: a spring-biased latch, a magnetic connection, a snap-fit connection using flexible elements, or the like. In another example, instead of a post which protrudes from the surface 182 of the link 180, the passive optical tracking element 58 may include a base that is inserted into a bore defined beneath the surface 182 of the link 180, such as, but not limited to the bore 184 described above. The connection between the base of the passive optical tracking element 58 and the bore may be threaded. In another example, instead of being threaded, the bore may be smooth and may include a locking feature within the bore that captures a portion of the base of the optical tracking element. This could be implemented as a "push and twist" connection such that the base of the optical tracking element is rotated within bore and the bore locks the base using the locking feature. The locking feature may be a cam surface, an elastic surface, a groove or tab, or any other type of feature that holds the base of the tracking element within the bore. As will be described below, this connection between the passive optical tracking element 58 and the post or bore of the link 180 may be facilitated underneath, over, or through a surgical drape that covers the robotic arm of the manipulator 14. Thus, connection between the optical tracking element 58 and the link 180 may be a sterile or non-sterile connection.

In some instances, the passive optical tracking element 58 may be configured to magnetically attach to any portion of any one or more links of the manipulator 14. This configuration may provide the user with the means to define a custom tracker link geometry based on the user-defined positioning of the optical tracking elements 58. The localizer 44 may be utilized to register the custom tracker link during a robot registration process whereby the manipulator 14 is moved through various positions relative to the localizer 44. Kinematic data from the manipulator 14 and localization data from the localizer 44 may be fused, combined, or compared to establish a transform from the custom tracker link to the base 16 of the manipulator 14.

Although a removal tracker assembly 110 has been described above, the tracker assembly 110 may alternatively be bonded, fixed, or integrally formed to the trackable link 180 to provide a stable location for the tracking element 112.

D. Removable Photosensor Assembly

Referring to FIG. 6C, the photosensors 62 may be realized as photosensor assemblies 150 to enable modularity and easy installation, assembly, serviceability, and removal of the photosensors 62 relative to the trackable link 180. The photosensor assemblies 150 may each include a photosensor base 152 defining a void 154, a photodiode unit 156 disposed in the void 154, and a photosensor filter 158 disposed on, coupled to, or formed with the photodiode unit 156. The photosensor filter 158 may filter the light received by the photodiode unit 156 and the filter 158 may be opaque in the visible spectrum and transparent in the IR spectrum such that visible light is filtered out while IR light is allowed to pass through the filter 158. This allows the photosensor unit 156 to receive signals from the navigation system 32 without interference from visible light sources. The photosensor filter 158 may also have an anti-reflective surface or surface features so that signals from the navigation system 32, or elsewhere, are not reflected back toward the optical sensors 50 of the localizer 44. For example, the filter 158 may have a fine bead blasted finish, may be rough, and/or may have a textured surface. Alternatively, the filter 158 may be transparent to both the visible and non-visible light spectrums.

In the figures, the photosensor assembly 150 is installable to and/or removable from the link surface 182 and the photosensor base 152 is disposed between the link surface 182 and the photodiode unit 156. More specifically, the photosensor base 152 may be disposed in one of the bores 184 designed for the photosensor assembly 150. The bore 184 may include a threaded interface 160 configured to engage complementary threads 162 included on the photosensor filter 158. When the threaded interface 160 is moved into engagement with the complementary threads 162, the photodiode unit 156 is captured between the photosensor base 152 and the photosensor filter 158. The photosensor filter 158 may be urged against the photosensor base 152 when the threaded interface 160 is moved into engagement with the complementary threads 162 without pushing on the photodiode unit 156. Therefore, photodiode unit 156 is secured but physical stress to the photodiode unit 156 is avoided. In addition, the photosensor base 152 may be formed of an insulating material such that the base 152 acts as an electrical insulator and insulates the photodiode unit 156 from the link 18 and/or the link surface 182 (which may be formed of metal and hence, electrically conductive). It is further contemplated to form the photosensor base 152 integral with the trackable link 180.

E. Tracker and Photosensor Platforms and Orientation

Referring back to FIGS. 4A-4C, it may be desirable for the tracker and photosensor assemblies 110, 150 to be arranged such that line-of-sight between the navigation system 32 and the assemblies 110, 150 is better maintained or optimal. The manipulator 14 and the localizer 44 may be positioned at different heights relative to the floor and/or at different poses. This is particularly true as the arm of the manipulator 14 is moved during operation. To that end, the trackable link 180 may further include platforms 186A, 186B extending above the link surface 182 and arranged to support components of the trackable link 180. In the figures, two different types of platforms are shown: a tracker platform 186A and a photosensor platform 186B. The platforms 186A, 186B may be of varying shapes and sizes and disposed anywhere on the link surface 182. The tracker and photosensor platforms 186A, 186B may define the bores 184 arranged to receive the tracker assembly 110 and the photosensor assembly 150, respectively. With reference to FIG. 4B, tracker platforms 186A may each define a planar surface

188. This planar surface 188 may be parallel to the longitudinal axis PLA1. The tracker assembly 110 received by the tracker platform 186A may be disposed at a first interior angle IA1 relative to the planar surface 188 to optimize the visibility of the tracker assembly 110 to the localizer 44. In the illustrated implementation, the first interior angle IA1 is in a range defined between 45 and 85 degrees, but can be other ranges or values. Similarly, the bore 184 defined by the photosensor platform 186B may be disposed at a second interior angle IA2 with respect to the link surface 180 such that the photosensor assembly 150 disposed therein is disposed at the interior angle IA2. The second interior angle IA2 is in a range defined between 15 and 35 degrees, but can be other ranges or values. It is further contemplated to change the interior angles IA1, IA2 to increase the visibility of the tracker and photosensor assemblies 110, 150 relative to the localizer 44. For example, the interior angles IA1, IA2 could be 0 degrees if the localizer 44 is located at a similar height to the trackable link 180. The respective tracker platforms 186A can have the same interior angle IA1 or different interior angles. Similarly, the respective photosensor platforms 186B can have the same interior angle IA2 or different interior angles.

Additionally, the platforms 186A, 186B can be aimed in different directions relative to the link surface 182. For instance, in FIG. 4B, each of the platforms 186A, 186B are aimed upwards relative to the image shown. However, this configuration can be different. In other words, some platforms 186A, 186B can be aimed downwards, or to the side. The direction at which these platforms 186A, 186B aim can be predetermined factors such as manipulator 14 range of motion and localizer 44 visibility relative to the range of motion. Additionally, one tracker platform 186A can support one optical tracking element 58 or more than one optical tracking element 58. When two optical tracking elements 58 are supported by one tracker platform 186A, the tracker platform 186A may have two different platform faces that form two interior angles IA1. Hence, the optical tracking elements 58 of the common platform 186A can be aimed in two different directions. Having platforms 186A, 186B aimed in different directions relative to the trackable link 180 can provide spatial diversity to optimize communication with the localizer 44.

Although a removal photosensor assembly 150 has been described above, the photosensor assembly 150 may alternatively be bonded, fixed, or integrally formed to the trackable link 180 to provide a stable location for the photosensor assembly 150.

F. Draping

It is further contemplated to cover at least a portion of the surgical robotic system 10 (e.g., the manipulator 14) with a surgical drape to create a barrier between the system 10 and a sterile field in which the system 10 is operating. The surgical drape is arranged to cover at least a portion of the manipulator 14, and the end effector 22 is connected to the draped manipulator 14 such that a sterile barrier is formed between the two components 14, 22. An example of the surgical robot drape with drape attachment elements is described in U.S. Pat. No. 11,096,754, entitled "Sterile Drape Assembly for Surgical Robot," incorporated herein by reference.

To be utilized with the trackable link 180 described herein, the surgical drape or drape assembly may be designed to cover the optical tracking elements 58 or photosensors 62. The optical tracking elements 58 or photosensors 62 can operate through the drape. The drape or drape assembly can include drape attachment elements (such as elastic bands or snap rings) which secure the drape to one or more optical tracking elements 58 and/or photosensors 62. In one implementation, the drape is positioned over the tracking assemblies 110 and/or photosensor assemblies 150. In such cases, the drape attachment elements can secure a portion of the drape to or around any component of the tracking assembly 110 (i.e., tracking element 112, tracker container 114, cap 116) and/or any components of the photosensor assembly 150 (i.e., photosensor base 152, void 154, photodiode unit 156, photosensor filter 158). In other implementations, the optical tracking elements 58 and/or photosensors 62 can be covered with the drape without need for any attachment features due to the robustness of the optical tracking elements 58 ability to transmit signals and the photosensors 62 ability to receive IR signals through the optically transparent drape material. In yet another example, the drape may be integrated with optically transparent windows, e.g., made of a more rigid material than the drape material, and the windows can be arranged and sized to align to the respective optical tracking elements 58 or photosensors 62 of the trackable link 180. The drape may include indicia or instructions to help guide the user on where to place the windows relative to the optical tracking elements 58 or photosensors 62.

In other examples, a drape attachment apparatus may include a geometry that is sized to the link tracker geometry 210 such that, after the drape is placed over the robotic arm, the drape attachment apparatus can be snapped or located onto all of the optical tracking elements 58 of one of the link trackers 200. In other examples, the drape attachment apparatus may include a geometry that is sized to a partial link tracker geometry 210 such that the drape attachment apparatus can be snapped or located onto some (e.g., 4) of the optical tracking elements 58 of one of the link trackers 200. In another example, the drape attachment apparatus may include a geometry that is sized to all of the link tracker geometries 210 such that one drape attachment apparatus can be snapped or located onto all of the optical tracking elements 58 of all of the link trackers 200. Any of these configurations of a drape attachment apparatus can be modified to include attachment features for any one or more of the photosensors.

In yet another example, the optical tracking elements 58 may be installed to the link 180 after the drape is placed over the robotic arm. For instance, the optical tracking elements 58 may magnetically couple to corresponding connection features on the link 180 through the material of the drape and without puncturing the drape or compromising the sterile field. In another example, as described above, the link 180 may comprise posts that are configured to attach to optical tracking elements 58. The drape may cover the posts and the connection between the post and the optical tracking element 58 may be designed with additional space to capture the drape material therebetween without puncturing the drape. In another example, the optical tracking element 58 and/or post may comprise seal. In this situation, the drape may cover the post and the user may puncture the drape using the post such that the post extends through a hole in the drape material. The connection between the post and the optical tracking element 58 is then made over the drape material and the seal of the post and/or optical tracking element 58 may is configured to seal the hole in the drape.

G. Advanced Tracking Techniques

Referring back to FIG. 2, the trackers of the robotic system 52A, 52B, 52C are shown in communication with optical sensors 50 of the navigation system 32 to indicate the state (e.g., the location and/or orientation) of the manipulator 14. More specifically, relative to the localizer 44, the end effector tracker 52A provides the state of the end effector 22, the base tracker 52B provides the state of the base 16, and the link tracker assembly 52C provides the state of the base 16 and/or the trackable link 180. As noted above, the system 10 could employ the joint/motor encoders, or any other non-encoder position sensing method, to enable state of the end effector 22 and/or the trackable link 180 to be determined. The end effector tracker 52A and base tracker 52B may be optional components. However, when these robotic system trackers 52A, 52B, 52C are available, the navigation system 32 can analyze and/or combine the various states of these trackers 52A, 52B, 52C to determine certain aspects of the manipulator 14 or to make dynamic adjustments for the tracking system.

In one implementation, the navigation system 32 may be configured to automatically determine which of the trackers 52A, 52B, 52C should be activated or deactivated at any given time. This determination can be made based on any suitable condition, such as a line-of-sight obstruction, user settings or preferences, a type surgical procedure, start or end of a surgical step, location of patient or staff, type of tool or end effector, location of any of the trackers, location of the manipulator, location of the tool or end effector, collisions with the manipulator or any object coupled thereto, or the like. The navigation system 32 can anticipate presence of these condition to predictively activate or deactivate a given tracker 52A, 52B, 52C before the condition occurs. In one implementation, the localizer 44 is able to detect one of the trackers 52A, 52B, 52C experiencing a line-of-sight obstruction with the optical sensors 50, and the localizer 44 may use this information to selectively enable another one or more of the trackers 52A, 52B, 52C that are in line-of-sight with the optical sensors 50. For example, the localizer 44 may determine that line-of-sight of the base tracker 52B is obstructed and in response activate or track the link tracker assembly 52C, or vice-versa.

The localizer 44 may be further configured to continue tracking the trackable link 180 of the manipulator 14 even if the optical sensors 50 lose line-of-sight with one link tracker assembly 200A, 200B, 200C. For example, the localizer 44 may be configured to periodically send the signal 300 meant for the photosensors 62A, 62B, 62C to dynamically activate and/or deactivate any of the link tracker assemblies 200A, 200B, 200C. Alternatively, all of the link tracker assemblies 200A, 200B, 200C may be enabled at the same time. In this case, the localizer 44 may track the most fully visible link tracker assembly 200 for any given pose of the manipulator 14. As the manipulator 14 changes pose, the localizer 44 may gradually lose sight of the link tracker assembly 200 that was previously most fully visible, and the localizer 44 can track another link tracker assembly 200 that becomes most visible. To do so, the localizer 44 can track full tracking geometries 210A, 210B, 210C or partial tracking geometries at the same time and the controllers can assess the visibility for any given time frame of the localizer 44 and/or pose of the manipulator 14. In some situations, it is also possible for the localizer 44 to track the link 180 using partial geometries only, where no full tracking geometries 210A, 210B, 210C are visible. For instance, the localizer 44 may track for the right two optical tracking elements 58A of the first tracking geometry 210A, and the left two optical tracking elements of the second tracking geometry 210B. The navigation system 32 may combine the partial geometries of the first and second link tracker assemblies 200A, 200B during transitional states where no full tracker geometry is visible.

The navigation system 32 can also selectively activate or deactivate tracking of any of the link tracker assemblies 200A, 200B, 200C according to any predetermined or intraoperatively determined conditions, such as user settings or preferences, the type of procedure, start or end of a surgical step, specified poses of the manipulator, types of tools or end effectors coupled to the manipulator, collisions with the manipulator, location of patient or staff, a location of the end effector or tool, a location of the manipulator or its links, and the like. The navigation system 32 can anticipate presence of these condition to predictively activate or deactivate a given link tracker assemblies 200A, 200B, 200C before the condition occurs.

The navigation system 32 can also combine any tracking geometries related to the end effector tracker 52A, base tracker 52B, and link tracker assembly 52C. For example, the navigation system 32 may be configured to combine the tracking geometries of the end effector tracker 52A and the link tracker assembly 52C. In this case, the end effector tracking geometry (which may be one or more optical tracking elements) and at least one of the first, second, and third tracking geometries 210A, 210B, 210C of the trackable link 180 are combined to form the combinational tracking geometry. Other combined tracking geometry configurations are contemplated.

The navigation system 32 may be configured to selectively control activation of the end effector tracker 52A, base tracker 52B, and/or link tracker assembly 52C. This selective control can be in response to user input or in response to an automated determination made by the navigation system 34. For instance, the navigation system 34 can be automated to selectively activate or deactivate the trackers 52A, 52B, 52C for purposes such as: choosing the optimal line-of-sight for any given condition or moment, in response to a chosen surgical procedure, surgical setup, type of procedure, step of a procedure, location of patient or staff, or the like, which can be predetermined or intraoperatively determined conditions.

Figure 7:
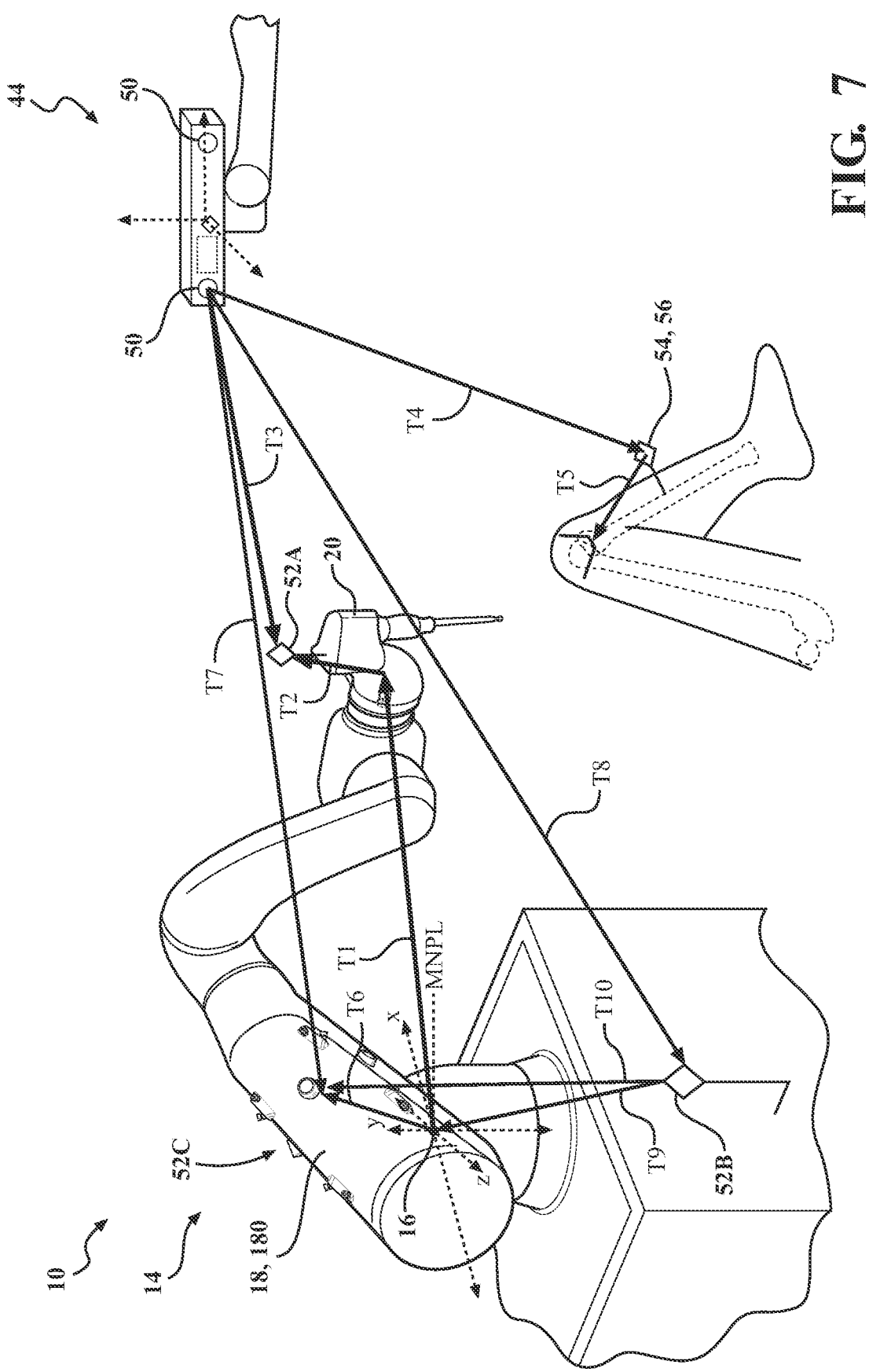
FIG. 7 is a perspective view illustrating transforms between components of the surgical robotic system, according to one implementation.

Referring to FIG. 7, the navigation system 32 may be configured to determine relationships between various components or reference points of the robotic system to perform actions or dynamic adjustments related to tracking. In FIG. 7, the state of one component or reference point of the system 10 relative to the state of another component or reference point is represented as a transform (T) and is indicated with an arrow. In one implementation, each transform (T) is specified as a transformation matrix, such as a 4×4 homogenous transformation matrix. The transformation matrix, for example, includes three unit vectors representing orientation, specifying the axes (X, Y, Z) from the first coordinate system expressed in coordinates of the second coordinate system (forming a rotation matrix), and one vector (position vector) representing position using the origin from the first coordinate system expressed in coordinates of the second coordinate system. The transform (T), when calculated, gives the state (position and/or orientation) of the component or reference point from the first coordinate system given with respect to a second coordinate system. The control system 60 calculates/obtains and combines a plurality of transforms (T1–T10) from the various components of the system 10 to control the manipulator 14, as described herein. Example systems and methods for utilizing the transforms of the various components of the system can be like those explained in U.S. Pat. No. 9,119,655, entitled, "Surgical Manipulator Capable of Controlling a Surgical Instrument in Multiple Modes," and U.S. Pat. No. 10,660,715, entitled, "Techniques for Detecting Errors or Loss of Accuracy in a Surgical Robotic System," the disclosures of both of these patents being hereby incorporated by reference in their entirety.

As shown in FIG. 7, example transforms include a first transform T1 between the base 16 and the tool 20, a second transform T2 between the tool 20 and the end effector tracker 52A (when available), a third transform T3 between the localizer 44 and the end effector tracker 52A, and a fourth transform T4 between the localizer 44 and one or more of the patient trackers 54, 56. A fifth transform T5 may be calculated between one or more of the patient trackers 54, 56 and a virtual boundary associated with the anatomy of the patient 12 using registration techniques involving the navigation system 32 and the pointer P. Specifically, the pointer P may be tracked by the navigation system 32 via the pointer tracker PT and is touched to various points on a surface of the anatomy. The navigation system 32, knowing the state of the pointer P, registers the state of the anatomy with respect to one or more of the patient trackers 54, 56. Alternatively, T5 may be broken up into additional intermediate transforms that are combined to result in T5. For example, the additional transforms may correspond to implant placement surgical planning relative to a pre-op image, acquired using techniques such as CT, MRI, etc., and location of the one or more patient trackers 54, 56 relative to that same pre-op image (registration).

The transforms may further include a sixth transform T6 between the base 16 and the trackable link 180. For instance, transform T6 may be performed relative to one or more optical tracking elements 58, the link tracker assemblies 200A, 200B, 200C, the center of the link tracker geometry 210, any combined link tracker geometries 210, or a reference point of the link 18, such as the link axis PLA1 relative to any of these features. The link tracker assemblies 200A, 200B, 200C are fixed to the trackable link 180. Therefore, this presents an opportunity to for the system 10 to be factory calibrated to store the state (known relationship) of the link tracker assemblies 200A, 200B, 200C relative to the trackable link 180. Furthermore, the trackable link 180 pose can be determined from joint encoder data. Specifically, the control system 60 acquires raw kinematic measurement data relating to the state of the trackable link 180. For instance, the raw kinematic measurement data may be data defining the state of the first and second joints J1, J2 obtained from the joint encoders 19. The state of the trackable link 180 may be determined relative to the manipulator coordinate system MNPL. The raw kinematic measurement data relates to the state of the trackable link 180 relative to the base 16. The state of the trackable link 180 is measured relative to the base 16 because the state of the base 16 is assumed to be stationary and the trackable link 180 moves relative to the base 16. Therefore, the state of the link tracker assemblies 200A, 200B, 200C relative to the base 16 can be known for any given pose of the manipulator 14 by combining known relationship data between the link tracker assemblies 200 and the trackable link 180 and kinematic data of the trackable link 180 relative to the base 16

A seventh transform T7 can be computed between the localizer 44 and the trackable link 180. An eighth transform T8 can be computed between the localizer 44 and the base tracker 52B, when available A ninth transform T9 can be computed between the base tracker 52B and base 16 (if this relationship is known). A tenth transform T10 can be computed between the trackable link 180 and the base tracker 52B as both can be tracked by the localizer 44.

It should be appreciated that the transforms T6, T7 and T10 involving the trackable link 180 are depicted in FIG. 7 as arrows that terminate near the center of the link tracker assembly 52C (i.e. the center of the second tracking geometry 210), but the transforms T6, T7, T10 could be relative to any position on or proximate to the link tracker assembly 52C. The other transforms T1–T5, T8, T9 could also be relative to any position on or proximate to the respective element subject to transformation.

One example of utilizing these transforms can be when the base tracker 52B is used. The base tracker 52B is set up manually relative to the base 16 of the manipulator 14. However, the location of the base tracker 52B relative to the base 16 may not be initially known unless some calibration is manually performed by the user using the navigation system 32. In other words, transform T9 may not be readily determinable. Accordingly, in one technique, the navigation system 32 may utilize the trackable link 180 to quickly determine the location of the base tracker 52B relative to the base 16 without requiring calibration steps performed by the user. To do so, in one implementation, the navigation system 32 can track the trackable link 180 and the base tracker 52B at the same time to obtain transforms T8 (base tracker 52B to localizer 44), T7 (trackable link 180 to localizer 44) and utilize T7 and T8 to derive T10 (base tracker 52B and the trackable link 180). The navigation system 32 can further acquire the known relationship between the trackable link 180 and the base 16 through transform T6. Accordingly, by combining transforms T10+T6, the state of the base tracker 52B relative to the base 16 can be determined. These transforms T6, T7, T8, and T10 can be computed in any order.

In another example, the trackable link 180 can be utilized to recover, calibrate, or confirm the kinematic data of the manipulator 14, represented by transform T1 (base 16 to tool 20). For instance, it may be that integrity of transform T1 may be distorted or lost due to deformation of the manipulator 14. Here, the navigation system 32 can recover, calibrate or confirm the pose the tool 20. The navigation system 32 can combine transform T6 (trackable link 180 to base 16), transform T7 (trackable link 180 to localizer 44), transform T3 (localizer 44 to end effector tracker 52A), and transform T2 (tool 20 to end effector tracker 52A). From these transforms, the navigation system 32 can either infer transform T1 (base 16 to tool 20) (if this transform is unavailable) or verify that transform T1 (if available) is accurate based on comparing T1 with T6+T7+T1+T2. This technique can be utilized in for various transforms and to recover, calibrate or confirm operation of various components (e.g., link tracker 180 or base tracker 52B).

In another example, the end effector tracker 52A state may be lost or may need to be verified to due deformation of the manipulator 14. Here, the navigation system 32 can recover, calibrate, and/or confirm the pose the end effector tracker 52A using the trackable link 180. The navigation system 32 can combine transform T7 (trackable link 180 to localizer 44), transform T6 (trackable link 180 to base 16), transform T1 (base 16 to tool 20) and transform T2 (tool 20 to end effector tracker 52A). From these transforms, the navigation system 32 can either infer transform T3 (end effector tracker 52A to localizer 44) (if this transform is unavailable) or verify that transform T3 (if available) is accurate based on comparing T3 with T7+T6+T1+T2.

These techniques may include moving the manipulator 14 to a predetermined position or through a series of predetermined positions in order to recover, calibrate, and/or confirm the pose of the link tracker 180, base tracker 52B, and/or end effector tracker 52A as determined by the navigation system 32 and the kinematic data of the manipulator 14. As the manipulator 14 is moved to the predetermined position or through the series of predetermined positions, the navigation system 32 may determine the expected positions of the various parts of the system 10 based on the link tracker 180, base tracker 52B, and/or end effector tracker 52A. At the same time, these expected positions can be compared against the expected position as determined by the kinematic data of the manipulator 14 to confirm that the expected positions as determined by the joint encoders and the navigation system 32 are substantially similar. These techniques may also be used to recover, calibrate, and/or confirm the pose of the TCP.

These techniques can be utilized with any combination of transforms to recover, calibrate, and/or confirm operation of various components (e.g., link tracker 180, base tracker 52B, end effector tracker 52A, tool 20, base 16, patient tracker 54, 56, localizer 44).

Several implementations have been discussed in the foregoing description. However, the implementations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A surgical robotic system comprising:
   a base; and
   a robotic arm coupled to the base and comprising:
      a plurality of links with each link defining a link surface;
      a plurality of joints configured to enable movement of the plurality of links; and
      a link tracker assembly configured to be assembled relative to the link surface of a longest link of the plurality of links, and wherein the link tracker assembly is formed by optical tracking elements that are configured to be removably coupled to the longest link.

2. The surgical robotic system of claim 1, wherein a plurality of posts extend from the link surface of the longest link and each post is configured to connect with one or more of the optical tracking elements.

3. The surgical robotic system of claim 1, wherein a plurality of bores are defined within the link surface of the longest link and each of the optical tracking elements comprise a base that is configured to be inserted within and secured to the bore.

4. The surgical robotic system of claim 1, further comprising a drape configured to cover the robotic arm, and wherein the optical tracking elements are configured to be coupled to the longest link after the robotic arm is covered with the drape such that the optical tracking elements are disposed over the drape.

5. The surgical robotic system of claim 1, wherein the optical tracking elements are configured to be coupled to the longest link using a magnetic connection.

6. The surgical robotic system of claim 5, wherein the optical tracking elements are configured to be coupled to the longest link using the magnetic connection to enable placement of the optical tracking elements relative to any portion of the longest link to define a customized tracking geometry for the link tracker assembly.

7. The surgical robotic system of claim 1, wherein the optical tracking elements are passive optical tracking elements.

8. The surgical robotic system of claim 1, wherein the optical tracking elements are active optical tracking elements; and further comprising:
   a photosensor assembly located on the link surface of at least one link of the plurality of links; and
   a controller coupled to the photosensor assembly and the link tracker assembly, wherein the controller is configured to control the link tracker assembly based on a signal received by the photosensor assembly.

9. The surgical robotic system of claim 1, wherein:
   the robotic arm supports an end effector; and
   the end effector comprises an end effector tracker that is integrated with a body of the end effector.

10. The surgical robotic system of claim 1, wherein the link tracker assembly is further defined as a first link tracker assembly, and wherein the robotic arm further comprises second and third link tracker assemblies located on the link surface of the longest link, and wherein each of the first, second, and third link tracker assemblies comprises a plurality of the optical tracking elements arranged in a tracking geometry on the link surface of the longest link, and wherein the tracking geometry of each the first, second, and third link tracker assemblies are different from one another.

11. The surgical robotic system of claim 10, wherein the longest link defines a longitudinal axis, and wherein the tracking geometry of each of the first, second, and third link tracker assemblies are located on the link surface of the longest link at a different location from one another about the longitudinal axis.

12. The surgical robotic system of claim 11, wherein the tracking geometries of at least two of the first, second, and third link tracker assemblies are located on the link surface 90 degrees apart or 180 degrees apart about the longitudinal axis of the longest link.

13. The surgical robotic system of claim 10, wherein the tracking geometry of each of the first, second, and third link tracker assemblies comprises exactly four optical tracking elements.

14. The surgical robotic system of claim 1, wherein the robotic arm comprises exactly six links arranged in a serial configuration and wherein the longest link is a second link from the base.

15. A navigation system configured to track movement of a surgical robotic system that includes a base and a robotic arm coupled to the base, the robotic arm having six links that are arranged in a serial configuration and include a longest link that is a second link from the base, the navigation system comprising:
   a link tracker assembly formed by optical tracking elements that are configured to be removably coupled to a link surface of the second link; and
   a localizer configured to track the link tracker assembly.

16. The navigation system of claim 15, wherein the optical tracking elements are further defined as light emitting diodes, and further comprising:

a photosensor assembly located on the link surface of at least one link of the six links; and a controller coupled to the photosensor assembly and the link tracker assembly, wherein the controller is configured to control the link tracker assembly based on a signal transmitted from the localizer to the photosensor assembly.

17. The navigation system of claim 15, wherein the robotic arm supports an end effector that comprises an end effector tracker, and wherein:

the localizer is configured to track both the link tracker assembly and the end effector tracker.

18. The navigation system of claim 15, wherein the link tracker assembly is further defined as a first link tracker assembly, and wherein the robotic arm further comprises second and third link tracker assemblies located on the link surface of the second link, and wherein each of the first, second, and third link tracker assemblies comprises a plurality of the optical tracking elements arranged in a tracking geometry on the link surface of the second link, and wherein the tracking geometry of each of the first, second, and third link tracker assemblies are different from one another.

19. A surgical system comprising:

a surgical robotic system including a base and a robotic arm coupled to the base, the robotic arm including exactly six links arranged in a serial configuration with each link defining a link surface, and a plurality of joints configured to enable movement of the links, wherein one of the links is a longest link and the longest link is a second link from the base;

a link tracker assembly formed by optical tracking elements, the optical tracking elements configured to be removably coupled to the longest link; and a localizer configured to track the link tracker assembly.

* * * * *